US011929679B2

(12) United States Patent
Sreenivas et al.

(10) Patent No.: US 11,929,679 B2
(45) Date of Patent: Mar. 12, 2024

(54) POWER SUPPLY CONFIGURATIONS AND PWM EDGE CONTROL

(71) Applicant: Infineon Technologies Austria AG, Villach (AT)

(72) Inventors: Venkat Sreenivas, Winchester, MA (US); Bikiran Goswami, Burlington, MA (US); Benjamim Tang, Rancho Palos Verdes, CA (US); Todd Bellefeuille, Georgetown, MA (US); Kang Peng, East Greenwich, CT (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/363,617

(22) Filed: Jun. 30, 2021

(65) Prior Publication Data
US 2023/0006556 A1 Jan. 5, 2023

(51) Int. Cl.
*H02M 3/158* (2006.01)
*H02M 1/00* (2006.01)

(52) U.S. Cl.
CPC ....... *H02M 3/1584* (2013.01); *H02M 1/0025* (2021.05)

(58) Field of Classification Search
CPC ........................... H02M 3/157; H02M 1/0025
See application file for complete search history.

(56) References Cited

U.S. PATENT DOCUMENTS

| 8,803,499 | B2 | 8/2014 | Sreenivas et al. | |
| 8,907,643 | B2 | 12/2014 | Sreenivas et al. | |
| 9,442,140 | B2 | 9/2016 | Bansal et al. | |
| RE46,419 | E * | 5/2017 | Isham | H03K 7/04 |
| 2003/0197245 | A1* | 10/2003 | Zhang | H02M 3/1584 |
| | | | | 257/532 |
| 2010/0013304 | A1* | 1/2010 | Heineman | H02J 1/001 |
| | | | | 307/31 |
| 2010/0102785 | A1 | 4/2010 | Young | |
| 2014/0312858 | A1 | 10/2014 | Sreenivas et al. | |
| 2015/0244269 | A1* | 8/2015 | Yu | H02M 3/156 |
| | | | | 323/284 |
| 2017/0141684 | A1* | 5/2017 | Beck | H02M 3/158 |

(Continued)

OTHER PUBLICATIONS

European Search Report, EP 22 18 1644, dated Nov. 8, 2022, pp. 1-8.

(Continued)

*Primary Examiner* — Alex Torres-Rivera
(74) *Attorney, Agent, or Firm* — Armis IP Law, LLC

(57) ABSTRACT

An apparatus includes a controller a current mode controller that produces an output voltage by supplying output current from at least one power supply phase of a power supply to power a load. The controller produces an error current signal based on a difference between a magnitude of the output current supplied from the power supply to a load and a phase current setpoint. Based on a magnitude of the error current signal, control a pulse width setting of a pulse width modulation signal controlling the at least one power supply phase. The controller varies a leading edge and a falling edge of a pulse width ON-time of the pulse width modulation signal over each of multiple control cycles depending on variations in the magnitude of the pulse width setting.

34 Claims, 20 Drawing Sheets

(56) References Cited

U.S. PATENT DOCUMENTS

2021/0408890 A1* 12/2021 Sun .................... H02M 3/1586

OTHER PUBLICATIONS

Liu Pei-Hsin et al, "Hybrid interleaving with adaptive PLL loop for adaptive on-time controlled switching converters", 2014 IEEE Energy Conversion Congress and Exposition (ECCE), IEEE, Sep. 14, 2014, pp. 4110-4117, XP032680913.

Milanovic, et al, "Digital Current Mode Control for Buck-Converter Based on Average Inductor Current Measurement", Transactions on Electrical Engineering, vol. 1 (2012), No. 1 pp. 1-6.

Vekslender, et al, "Fully-Integrated Digital Average Current-Mode Control 12V-to-1.xV Voltage Regulator Module IC", The Center for Power Electronics and Mixed-Signal IC, Department of Electrical and Computer Engineering. IEEE, 2017, 2043-2050.

Choudhury, Shamim, et al, "A DSP based Digitally Controlled Interleaved PFC Converter", Mar. 6, 2005, Applied power electronics conference and exposition, 2005 APEC 2005, 20th annual IEEE Austin, TX, USA Mar. 6-10, 2005, Piscataway, NJ, USA, IEEE, pp. 648-654, Applied power electronics conference and exposition, 2005 APEC 2005, 20th annual IEEE Austin, TX, USA Mar. 6-10, 2005, Piscataway, NJ, USA, IEEE, US.

EP Office Action, EP 22181 644.0, dated Jan. 24, 2024, pp. 1-8.

Pretorius, Kevin, et all, "Predictive Average Current Control for Power Factor Correction (PFC) Across Both Continuous (CCM) and discontinuous (DCM) conduction modes", Sep. 17, 2018, pp. 1-10, 2018 20th European conference on power electronics and applications (EPE'18 ECCE Europe), EPE Association.

\* cited by examiner

POWER SUPPLY CONFIGURATIONS AND PWM EDGE CONTROL

BACKGROUND

In a conventional Fixed Frequency PWM controller (Digital Controller, PID based voltage mode with Vin Feedforward), Vtarget is the regulator's target output voltage, adjusted for the feedback ratio of the voltage sensor. Verror is the error voltage, such as the difference between the feedback voltage and target voltage. A feed forward module provides feedforward computation of the nominal duty cycle ratio DO, based on measured, estimated, or fixed Vin.

A respective pulse width modulator (PWM) converts a received control signal and produces a pulse width modulation signal. This results in a PWM signal at a fixed frequency of FO, with variable duty cycle D responsive to the error voltage. The feedback loop thus tries to reduce the error voltage, such that the output voltage matches Vtarget, adjusted for the ratio of the voltage sensor.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

First Embodiments

Embodiments herein include novel ways of improving generation of a respective output voltage via a power converter.

For example, embodiments herein include an apparatus such as a power supply. The power supply includes components such as one or more power supply phases and a power supply controller. During operation, the power supply controller produces an output voltage via supply of current from one or more power supply phases of the power supply to power a load. In furtherance of producing the output voltage, the power supply controller generates a current control signal based on an error voltage signal indicating a difference between an output voltage and a reference setpoint voltage, such that under closed loop conditions, the control loop derives the current control signal that modulates the pulse width modulation signal of the power supply phases, causing the total phase currents supplied to the load to match the load current and drive the error voltage to effectively small value such that the output voltage matches the setpoint voltage.

Additionally, in further example embodiments, the power supply controller generates a switching period adjustment signal and a current adjustment signal based on an error voltage signal indicating a difference between an output voltage and a reference setpoint voltage. Under dynamic load conditions and changing output current, the switching period and current control signal are adjusted such that the error voltage under dynamic load is minimized, and the output voltage dynamic regulation is improved. The power supply controller then generates (such as via modulating or other suitable function) the pulse width modulation signal of the at least one power supply phases based on the switching period adjustment signal and the current adjustment signal. This effectively changes the pulse width On-time, Off-time, duty cycle, switching period, switching frequency and phase current of the power supply phase, which the controller applies in order to control the output voltage and phase currents of the regulator.

Thus, in one embodiment, in order to close the loop and provide regulation, the current control signal is generated (or derived) so that it drives the error voltage to effectively 0, making the output voltage match the setpoint voltage. The current adjustment signal as discussed herein provides adjustments during transient events to maintain the magnitude of the output voltage at a desired setpoint voltage.

In accordance with further example embodiments, the power supply controller produces a first phase current control signal based on the current control signal and a number of power supply phases in the power supply; the power supply controller derives a first pulse width setting from the first phase current control signal and then modulates (generates) a first pulse width modulation signal controlling the first power supply phase based on the first pulse width setting.

In accordance with further example embodiments, the power supply controller controls operation of multiple phases of the power supply such as a first power supply phase and a second power supply phase. For example, the power supply controller produces a first phase current control signal based on the current control signal and a number of power supply phases in the power supply. The power supply controller produces a first error current signal based on a difference between the first phase current control signal and a first current monitoring signal indicative of first output current supplied by the first power supply phase to the load. Additionally, the power supply controller derives a first pulse width setting from the first error current signal. The power supply controller then generates (such as modulates) a first pulse width modulation signal of the first power supply phase based on the first pulse width setting.

The power supply controller produces a second phase current control signal based on the current control signal and the number of power supply phases in the power supply. The power supply controller produces a second error current signal based on a difference between the second phase current control signal and a second current consumption signal indicative of second output current supplied by the second power supply phase. Additionally, the power supply controller derives a second pulse width setting from the second error current signal. The power supply controller then generates a second pulse width modulation signal of the second power supply phase based on the second pulse width setting.

Thus, embodiments herein include controlling multiple power supply phases to produce a respective output voltage to power a load.

In yet further example embodiments, the power supply controller: i) produces an error current signal (Ierror) based on a difference between the current control signal and a current consumption signal indicative of output current supplied by the first power supply phase and a second power supply phase to power a load, (for example, see FIG. 4 and corresponding description below with respect to summer 461 producing the error current signal 489) and ii) derives a pulse width setting from the error current signal and apply the pulse width setting to the pulse width modulation signal. In further example embodiments, the power supply controller: i) produces a nominal pulse width ON-time signal; ii) derives a pulse width ON-time adjustment signal from the error current signal; and iii) applies the pulse width ON-time adjustment signal to the nominal pulse width ON-time signal to control a pulse width of the pulse width modulation signal.

In one embodiment, the current control signal generated by the power supply controller indicates a total target output current to be supplied by a combination of the first power supply phase and the second power supply phase to the load.

In still further example embodiments, the power supply controller: i) produces a nominal switching period; and ii) applies the switching period adjustment signal to the nominal switching period to control a switching period and frequency of the pulse width modulation signal.

Further embodiments herein include, via the power supply controller, generating the switching period adjustment signal and the current adjustment signal based on a magnitude, slope, or a combination of magnitude and slop of the error voltage.

In still further example embodiments, the power supply controller is configured to operate in a non-linear variable frequency control mode of generating the pulse width modulation signal based on the error voltage. In one embodiment, the power supply controller operates in the non-linear control mode in response to a transient output current consumption condition.

As previously discussed, the power supply can be configured to include multiple power supply phases, each of which supply output current to the load. For example, in one embodiment, the power supply includes a second power supply phase controlled by the controller. The second power supply phase supplies corresponding second output current to the load. Thus, the first power supply phase supplies first output current to the load; the second power supply phase supplies second output current to the load.

In accordance with further embodiments, the power supply further includes a current monitor. Based on a magnitude of the first output current and a magnitude of the second output current, the current monitor (and controller) balances the first output current and the second output current via adjustment of a switching frequency of operating the first power supply phase the second power supply phase. For example, in response to detecting an imbalance in a magnitude of the first output current and the second output current, the current monitor changes a switching frequency of operating one or more of the first power supply phase and the second power supply phase. The change in switching frequency results in a change in the magnitudes of the output current from each power supply phase.

In further example embodiments, the power supply controller derives a pulse width ON-time adjustment signal from the current control signal; the power supply controller then varies the pulse width modulation signal based on the switching period adjustment signal and the pulse width ON-time adjustment signal.

Still further embodiments herein include, via the power supply controller, generating the current adjustment signal and the switching period adjustment signal (to be non-zero values) in response to detection of a transient current supplied by the output voltage to a dynamic load.

In one embodiment, the power supply controller generates the current adjustment signal (such as current boost adjustment signal) and the switching period adjustment signal in response to the error voltage being greater than a threshold value.

Note further that the power supply controller can be configured to include any number of control functions. For example, in one embodiment, the power supply controller includes a first PD (Proportional-Derivative) controller function operative to convert the error voltage into the switching period adjustment signal; the power supply controller includes a second PD (Proportional-Derivative) controller function operative to convert the error voltage into the current adjustment signal.

Thus, in one embodiment, the power supply controller implements a first controller function that produces the switching period adjustment signal from the error voltage; the power supply controller implements a second controller function operative to produce the current adjustment signal from the error voltage.

In further example embodiments, the power supply controller includes a summer function that produces an error current signal based on a difference between the current control signal and a current consumption signal. In one embodiment, the current consumption signal represents an amount of output current supplied by the first power supply phase to power a load. A third controller function of the power supply controller converts the error current signal into a pulse width ON-time adjustment signal. A pulse width modulation generator of the power supply controller produces the pulse width modulation signal based on the switching period adjustment signal and the pulse width ON-time adjustment signal.

Second Embodiments

Further embodiments herein include a power supply controller such as a current mode controller. During operation including conversion of an input voltage to an output voltage, the current mode controller produces an output voltage by supplying phase current from one or more power supply phases of a power supply to power a load. The current mode controller produces an error current signal (Ierror) based on a difference between a magnitude of output current (Ifeedback) supplied from the one or more power supply phase to a load and a phase current setpoint (Ictl). Based on a magnitude of the error current signal, the current mode controller controls a pulse width setting of a pulse width modulation signal controlling the power supply phase. In one embodiment, the current mode controller varies a leading edge and a falling edge of a pulse width ON-time of the pulse width modulation signal over each of multiple control cycles depending on variations in the magnitude of the pulse width setting.

Further embodiments herein include, via the current mode controller, producing an error voltage signal based on a difference between a magnitude of output voltage supplied from a power supply phase to a load and a voltage setpoint; and deriving, from an error voltage, the phase current setpoint in which to control the output current supplied by the power supply phase to the load. Additionally, the current mode controller varies a switching frequency of the pulse width modulation signal based on a magnitude of the error voltage, the error voltage representing a difference between a magnitude of the output voltage and a voltage setpoint of producing the output voltage.

In further example embodiments, the current mode controller: determines the magnitude of the output current over time from an emulated current signal representing the output current supplied from the power supply phase to the load; determines a magnitude of the output voltage based on a voltage feedback signal representative of the output voltage applied to the load; emulates the phase current over time based on a current feedback signal representative of the phase current supplied by the power supply phase and a state of the pulse width modulation signal controlling switching of the power supply phase; and determines the magnitude of the output current from a respective power supply phase based on the emulated phase current.

In one embodiment, the current mode controller receives a current measurement signal approximating a magnitude of the output current supplied by the power supply phase to the load and derives the emulated current signal from the current measurement signal.

In still further example embodiments, for a first control cycle of the multiple control cycles: generates a first ramp signal; derives a pulse width signal from the pulse width setting, the pulse width signal representing an amount of time in which to activate high side switch circuitry in the power supply phase to convert an input voltage into the output voltage; and controls timing of the leading edge of the pulse width modulation control signal based on a magnitude of the pulse width signal with respect to the first ramp signal.

Additionally, for the first control cycle, the current mode controller generates a second ramp signal with respect to the leading edge; and controls timing of the trailing edge of the pulse width modulation control signal based on the magnitude of the pulse width setting with respect to the second ramp signal. In such an embodiment, the magnitude of the pulse width signal at the leading edge of the first control cycle is different than the magnitude of the pulse width signal at the trailing edge of the first control cycle.

In yet further example embodiments, a timing of the leading edge of the pulse width modulation signal in a first control cycle of multiple control cycles depends on a magnitude of the pulse width setting; and a timing of the trailing edge of the pulse width modulation signal in the first control cycle of the multiple control cycles depends on the magnitude of the pulse width setting.

In further example embodiments, a magnitude of the pulse width setting at the leading edge of the pulse width modulation signal for a first control cycle is a first pulse width value; the magnitude of the pulse width setting at the trailing edge of the pulse width modulation signal for the first control cycle is a second pulse width value, the second pulse width value different than the first pulse width value. Thus, in one embodiment, the magnitude of the pulse width setting varies over the first control cycle and has an effect on the pulse width duration. In more specific example embodiments, the current mode controller varies a magnitude of the pulse width setting of the pulse width modulation signal during the pulse width ON-time of the pulse width modulation signal.

In still further example embodiments, the output current from the power supply phases includes first output current and second output current. A first power supply phase produces and supplies the first output current to the load; a second power supply phase of the power supply produces and supplies the second output current to the load. The power supply further includes a current monitor. The current monitor, based on a detected magnitude of the first output current and a magnitude of the second output current, balances the first output current and the second output current via adjustment of a switching frequency of controlling operation of the first power supply phase and the second power supply phase.

Note that although embodiments as discussed herein are applicable to power and voltage generation, the concepts disclosed herein may be advantageously applied in any suitable application.

Note further that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: produce an output voltage via supply of output current from at least one power supply phase of a power supply to power a load; generate a switching period adjustment signal based on an error voltage indicating a difference between the output voltage and a setpoint voltage; derive a current control signal from the error voltage; and generates a pulse width modulation signal of a first power supply phase based on the switching period adjustment signal and the current control signal.

Another embodiment herein includes a computer readable storage medium and/or system having instructions stored thereon. The instructions, when executed by computer processor hardware, cause the computer processor hardware (such as one or more co-located or disparately located processor devices) to: produce an output voltage by supplying phase current from at least one power supply phase of a power supply to power a load; produce an error current signal based on a difference between a magnitude of output current supplied from a power supply phase to a load and a phase current setpoint; based on a magnitude of the error current signal, control a pulse width setting of a pulse width modulation signal controlling the power supply phase; and vary a leading edge and a falling edge of a pulse width on-time of the pulse width modulation signal over each of multiple control cycles depending on variations in the magnitude of the pulse width setting.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of generating one or more output voltages to power a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
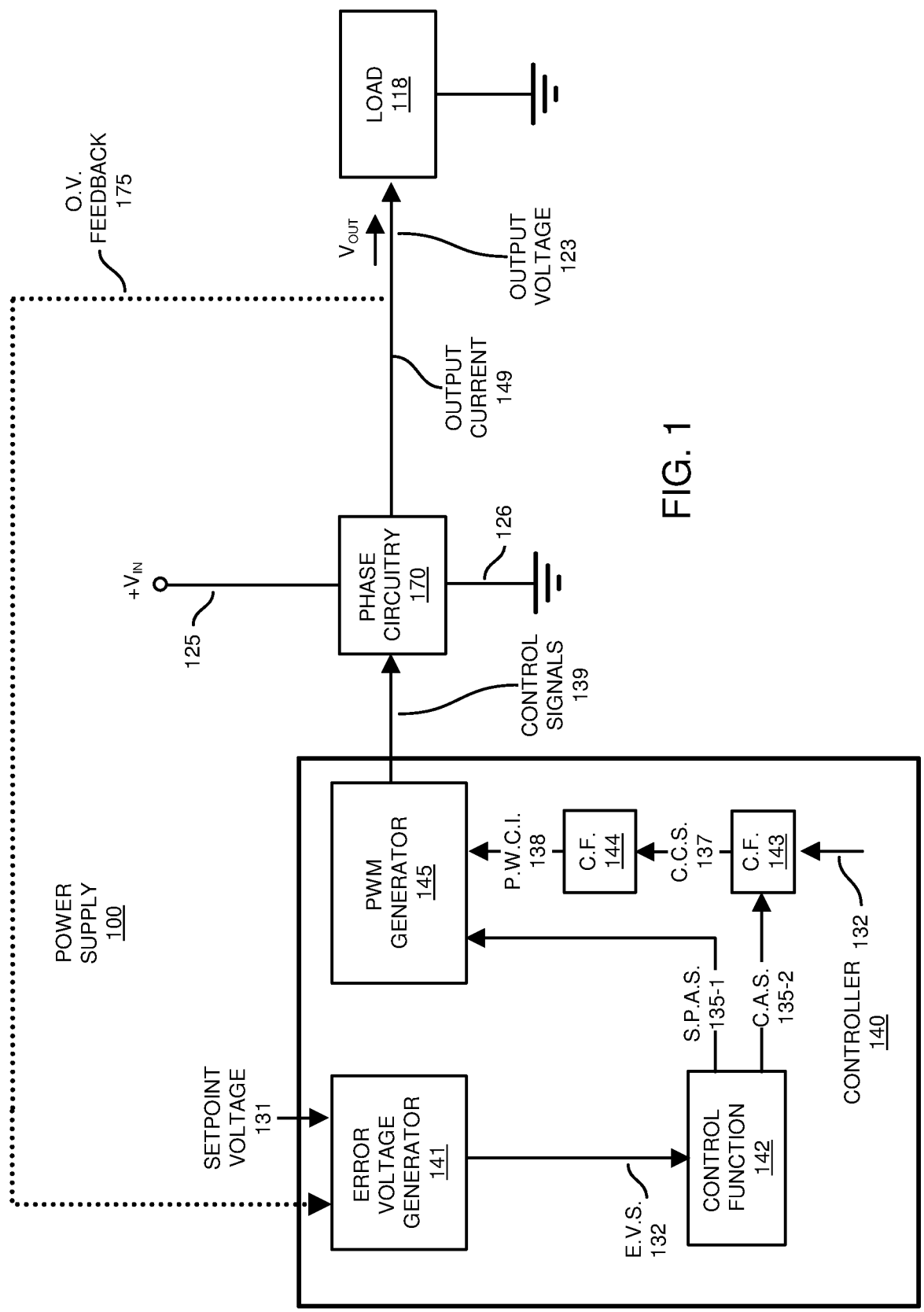
FIG. 1 is an example general diagram of a power supply and corresponding components according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include improvements in voltage regulator digital PWM controllers implementing novel current mode control and/or voltage mode control operations.

For example, in conventional multiphase buck converters, there are 3 primary control schemes used: voltage mode control, current mode control, and constant on time. There are advantages and disadvantages associated with each control mode. It is desirable that the control mode produce stable output voltage regulation responsive to changes in input voltage, output voltage, and output current. It is further desirable that a power supply controller is easy to configure, analyze, and optimize, while maintaining balanced phase currents, insensitivity to voltage and current sense high frequency noise.

Current Mode control is an attractive mode for its responsiveness, ease of tuneability, scalability to high phase count, and inherent current balance.

Current Mode control does have some limitations, such as the need to overcome potential instability of the current loop, sensitivity to current sense noise and latency, limitations to transient response due to fixed frequency operation, and higher overall implementation complexity.

First embodiments herein, as previously discussed, include implementing non-linear control in a digital current-mode control scheme, where the error voltage, the difference between the measured output voltage and the input voltage, set a current setpoint or current control target for each phase current, and the error current, the difference between the measured or estimated phase current and the phase current setpoint, set the duty cycle of a pulse width modulated control signal that controls the switching of the power switches in each phase, such that under dynamic load conditions and in response to a transient where the output load current, both pulse width and pulse frequency are simultaneously modulated to maintain regulation of a respective output voltage.

Second embodiments herein include a current mode controller operative to implement digital current mode control supporting features such as one or more of:
- Average current mode based PWM control, where the error current sets the pulse width and pulse frequency of each phase pwm control signal
- Dual edge PWM generator, where the leading edge transition timing is dependent on the pulse width control signal and the switching frequency or period control signal, and the trailing edge transition timing is dependent on the leading edge transition timing and the pulse width control signal, the pulse width control and switching frequency or period control signal both being variable as the measured voltage and phase current change over the switching period.
- Current feedback based on emulated inductor current synthesis, where the phase current is estimated based on discrete current samples and estimated rate of change in the current based on the state of the pulse width modulation control signal and the switch states in each phase.

Now, more specifically, FIG. 1 is an example diagram of a power supply according to embodiments herein.

As shown, power supply 100 includes controller 140, phase circuitry 170, and load 118. The power supply 100 produces corresponding output voltage 123 which powers the load 118. More specifically, during operation, the power supply controller 140 produces an output voltage 123 via supply of output current 149 from one or more power supply phases of phase circuitry 170 to power load 118.

As further shown, the controller 140 includes one or more of error voltage generator 141, control function 142, control function 143, control function 144, and PWM generator 145.

In accordance with more specific embodiments, as its name suggests, the error voltage generator 141 compares the output voltage feedback 175 (such as the output voltage 123 or other voltage signal derived from the output voltage 123) to the setpoint voltage 131 (a.k.a., reference voltage). The setpoint voltage 131 controls a regulation magnitude of the output voltage 123.

As an example, based on the difference between the output voltage feedback 175 and the setpoint voltage 131, the error voltage generator 141 produces the error voltage signal 132 (a.k.a., error voltage). The error voltage signal 132 indicates a degree to which the output voltage 123 is in or out of regulation. For example, the magnitude of the error voltage signal 132 increases in magnitude during conditions in which the output voltage 123 increases or decreases with respect to the setpoint voltage 131. A polarity of the error voltage indicates over-voltage and under-voltage conditions of the output voltage 123 with respect to the setpoint voltage 131.

In accordance with further embodiments, as further shown, the control function 142 of the controller 140 monitors the error voltage signal 132 indicating a difference between the output voltage 123 and the setpoint voltage 131 (a.k.a., reference voltage). Based on detected one or more attributes of the monitored error voltage signal 132, the controller 140 generates a switching period adjustment signal 135-1 and a current adjustment signal 135-2 based at least in part on the error voltage signal 132.

As further shown, the control function 143 of the power supply controller 140 derives a current control signal 137 from a combination of the error voltage signal 132 and the current adjustment signal 135-2.

In one embodiment, the current adjustment signal 135-2 is a so-called control current boost signal that causes a boost (positive or negative) in a magnitude of the output current 149 on an as-needed basis.

In still further example embodiments, the current control signal 137 represents a target of total output current 149 to be supplied to the load 118. More specifically, in one nonlimiting example embodiment, the current control signal 137 generated by the power supply controller 140 indicates a total target output current to be supplied by a combination of one or more power supply phases associated with the phase circuitry 170.

Based on a magnitude of the current control signal 137, the control function 144 of the power supply controller 140 produces pulse width control information 138 (such as one or more signals) that are used as a basis to control respective one or more pulse widths of the pulse width modulation control signals 139 produced by the pulse width modulation generator 145. As further discussed herein, in one embodiment, the pulse width information 138 controls an ON-time (and/or OFF-time) of respective switches in phase circuitry 170.

As its name suggests, the switching period adjustment signal 135-1 controls a switching period (and therefore corresponding switching frequency) associated with the pulse width modulation control signals 139.

Thus, in one embodiment, via a combination of the switching period adjustment signal 135-1 and the pulse width control information 138, the pulse width modulation generator 145 produces the control signals 139 controlling generation of output voltage 123 (and corresponding output current 149).

In one embodiment, the combination of the switching period adjustment signal 135-1 (such as frequency modulation adjustment signal) and the pulse width control information 138 indicates an amount by which to modify frequency and corresponding duty cycle of controlling respective switches associated with phase circuitry 170 to produce the output voltage 123 (output current 149) to power the load 118.

In further example embodiments, the power system 100 (apparatus) includes a controller 140 operative to: produce an output voltage 123 via supply of output current 149 from phase circuitry 170 (such as one or more power supply phases) to power a load 118. The controller 140 generates a switching period adjustment signal 135-1 based on an error voltage signal 132 indicating a difference between the output voltage 123 and a setpoint voltage 131. Via control function 143, the controller 140 derives a current control signal 137 from the error voltage 132. The controller 140 further modulates a respective pulse width modulation signal of a first power supply phase, second power supply phase, etc., based at least in part on the switching period adjustment signal 135-1 and the current control signal 137.

In accordance with more specific example embodiments, the power supply controller generates a current adjustment control signal 135-2 based on the error voltage 132. The controller 140 derives the current control signal 137 from the error voltage signal 132 and the current adjustment signal 135-2. The controller 140 modulates a pulse width modulation signal of a first power supply phase based on the switching period adjustment signal 135-1 and the current control signal 137.

Figure 2:
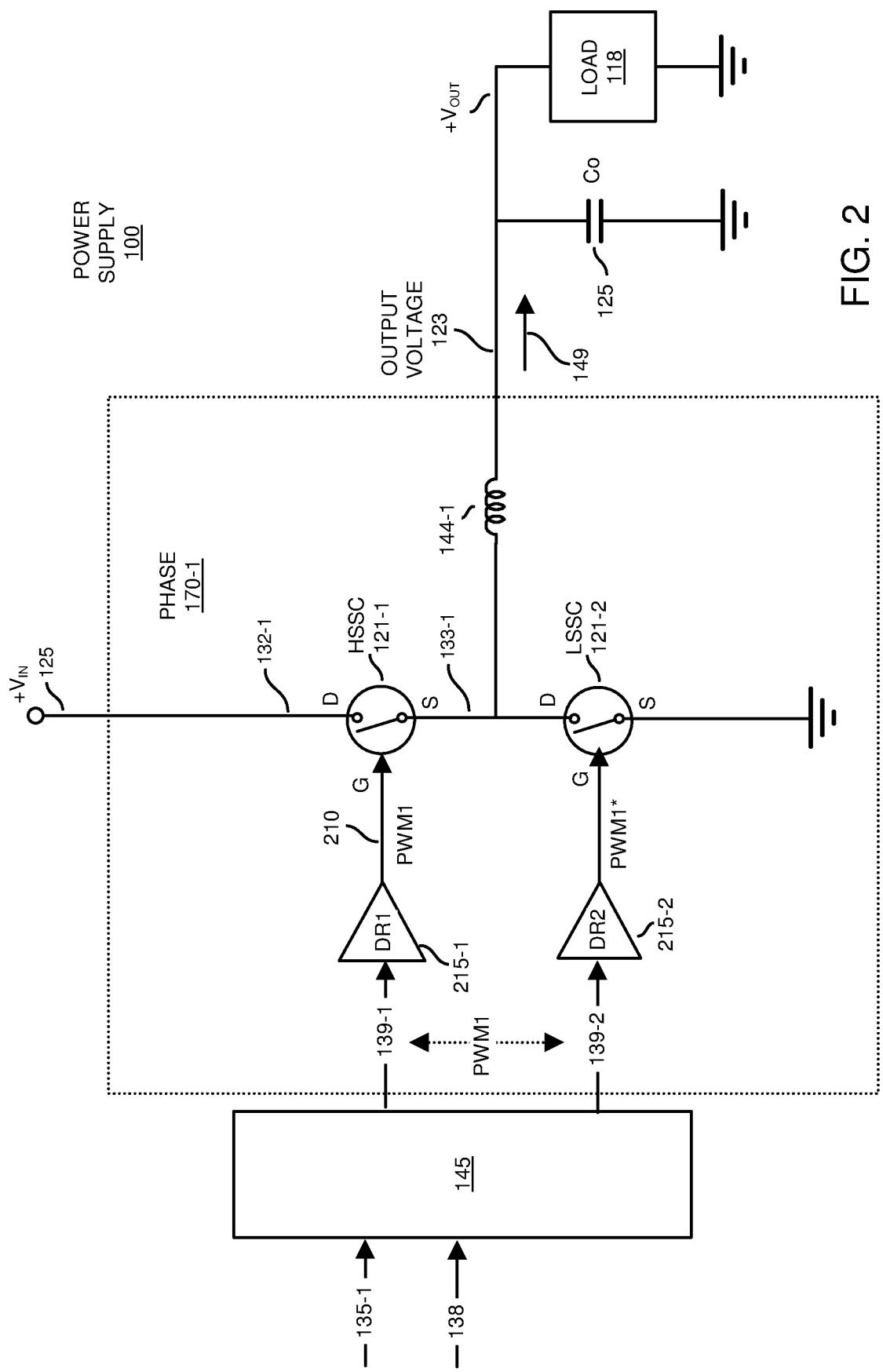
FIG. 2 is an example detailed diagram of a power supply phase according to embodiments herein.

FIG. 2 is an example more detailed diagram of a power supply phase according to embodiments herein.

As shown, FIG. 2 illustrates an example of phase circuitry 170 (such as implementation of a single power supply phase 170-1) to produce the output voltage 123 (and output current 149) based on switching period adjustment signal 135-1 and pulse width control information 138 in a so-called buck configuration for a given phase 170-1 of the phase circuitry 170 associated with power supply 100.

In this example embodiment, the phase circuitry 170-1 includes driver circuitry 215-1, driver circuitry 215-2, high side switch circuitry 121-1 (such as a control switch or switches), low side switch circuitry 121-2 (such as a synchronous switch or switches), pulse width modulation generator 145, and inductor 144-1.

The switching period adjustment signals 135-1 and pulse width control information 138 serve as a basis to produce: i) control signal 139-1 to control respective high side switch circuitry 121-1 ON and OFF, and ii) control signal 139-2 and low side switch circuitry 121-2 ON and OFF.

Note that switch circuitry 121-1 and 121-2 can be any suitable type of switch resource or resources (such as field effect transistors, bipolar junction transistors, etc.). In one embodiment, each of the high side switch circuitry 121-1 and low side switch circuitry 121-2 are or include one or more power MOSFET (Metal Oxide Semiconductor Field Effect Transistor) or other suitable switch devices.

Appropriate controlled switching of the high side switch circuitry 121-1 and the low side switch circuitry 121-2 results in generation of the output voltage 123 (and output current 149) via a respective DC-DC converter such as a buck converter configuration as shown. In one embodiment, the power supply phase 170-1 converts the input voltage 125 (Vin) such as a DC voltage into the output voltage 123 (such as a DC voltage).

Typically, the PWM generator 145 receives the control signals (such as switching period adjustment signal 135-1 and pulse width control information 138) from control function 142 and control function 144 (as previously discussed in FIG. 1), and on this basis, controls the driver circuitry 215-1 to produce a PWM control signal 210 (PWM1) to control high side switch circuitry 121-1 and a PWM control signal (PWM1* which is generally an inversion of PWM1) to control low-side switch circuitry 121-2.

In general, the low side switch circuitry 121-2 is activated (shorted or ON) when the high side switch circuitry 121-1 is deactivated (open or OFF). Conversely, the low side switch circuitry 121-2 is deactivated (open or off) when the high side switch circuitry 121-1 is activated (shorted or ON). There is a dead time between activating the high side switch circuitry and the low side switch circuitry such that both high side switch circuitry and low side switch circuitry are not ON at the same time.

Further variations of controller functions are discussed below in the following text and figures.

Figure 3:
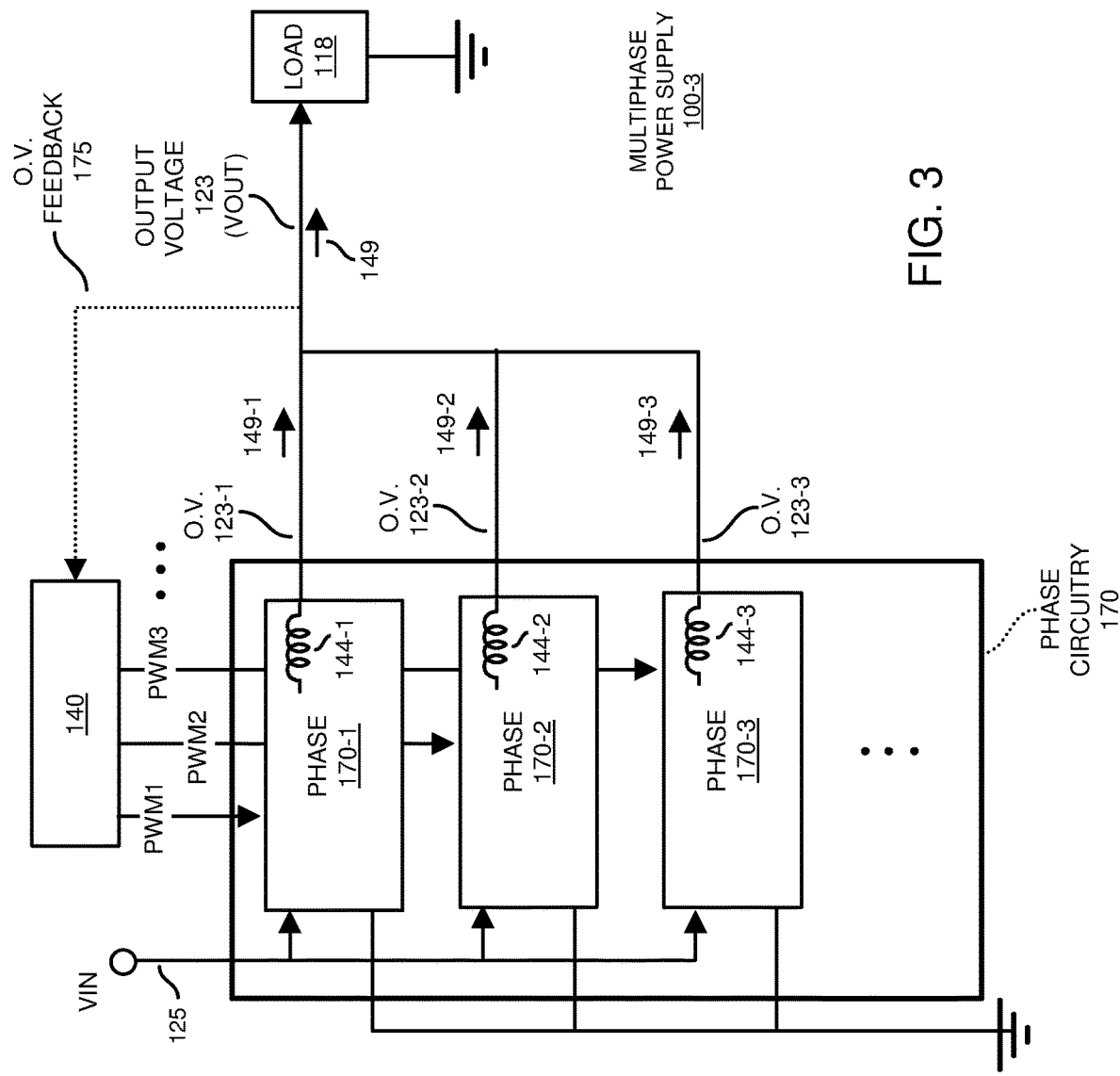
FIG. 3 is an example diagram illustrating a power supply including multiple phases according to embodiments herein.

FIG. 3 is an example diagram illustrating components associated with a phase controller according to embodiments herein.

In one embodiment, the power supply 100 as described herein is implemented as a multiphase buck converter implementing multidimensional control (for example, combination of on-time modulation and switching frequency modulation in each phase).

More specifically, in further example embodiments, the power supply 100 as described herein includes multiple phases. For example, as shown, in one embodiment, phase circuitry 170 of the multiphase power supply 100 is configured to include phase 170-1, phase 170-2, phase 170-3, etc.

Each of the power supply phases 170-2, 170-3, etc., is configured to include the same components as set forth in FIG. 2. The phases are independently controlled via controller 140 but collectively produce the output voltage 123. Any of one or more of the multiple phases are simultaneously activated to collectively produce the output voltage 123.

Each of the power supply phases (such as offset in phase with respect to each other) contributes to supplying total output current 149 to the load 118.

For example, via generated control signals PWM1, the power supply phase 170-1 produces output current 149-1 supplied to the load 118; via generated control signals PWM2, the power supply phase 170-2 produces output current 149-2 supplied to the load 118; via generated control signals PWM3, the power supply phase 170-3 produces output current 149-3 supplied to the load 118; and so on.

Benefits of Embodiments Herein

Average current mode control as described herein allows:
    Flexible architecture. It can work with the constant frequency mode needed in Telecom applications. It can sync to an external clock.
    Inductor currents and Capacitor voltages are tightly coupled in the control method. Results in a robust, resilient solution.
    Native phase current balance is very good. Without any additional action, we have been able to sweep load oscillation frequencies.
    Easy to implement pulse by pulse current limit.
    Easy to parallel controllers for the future. Easy current sharing.
    Easier to add/drop phases since the control variable is total current, not duty cycle.
    Easier control of phase currents. Can create imbalances if necessary.
    Minimizes impact of inductance and the double pole location in the loop response. Easy coefficient scaling, results in ease of tuneability.

Current-Mode Control Using Emulated Current Synthesis Further Allows:

Using low dynamic range ADC to sense inductor current. Reducing silicon area and ADC design complexity.
    Inductor current sense noise filtering/immunity. More robust inductor current sensing.
    Reducing latencies in the inductor current sense since current waveform is predicted/synthesized digitally and only corrected periodically using ADC data from actual current sense.

Additional details of implementing and controlling one or more phases is further discussed below.

Figure 4:
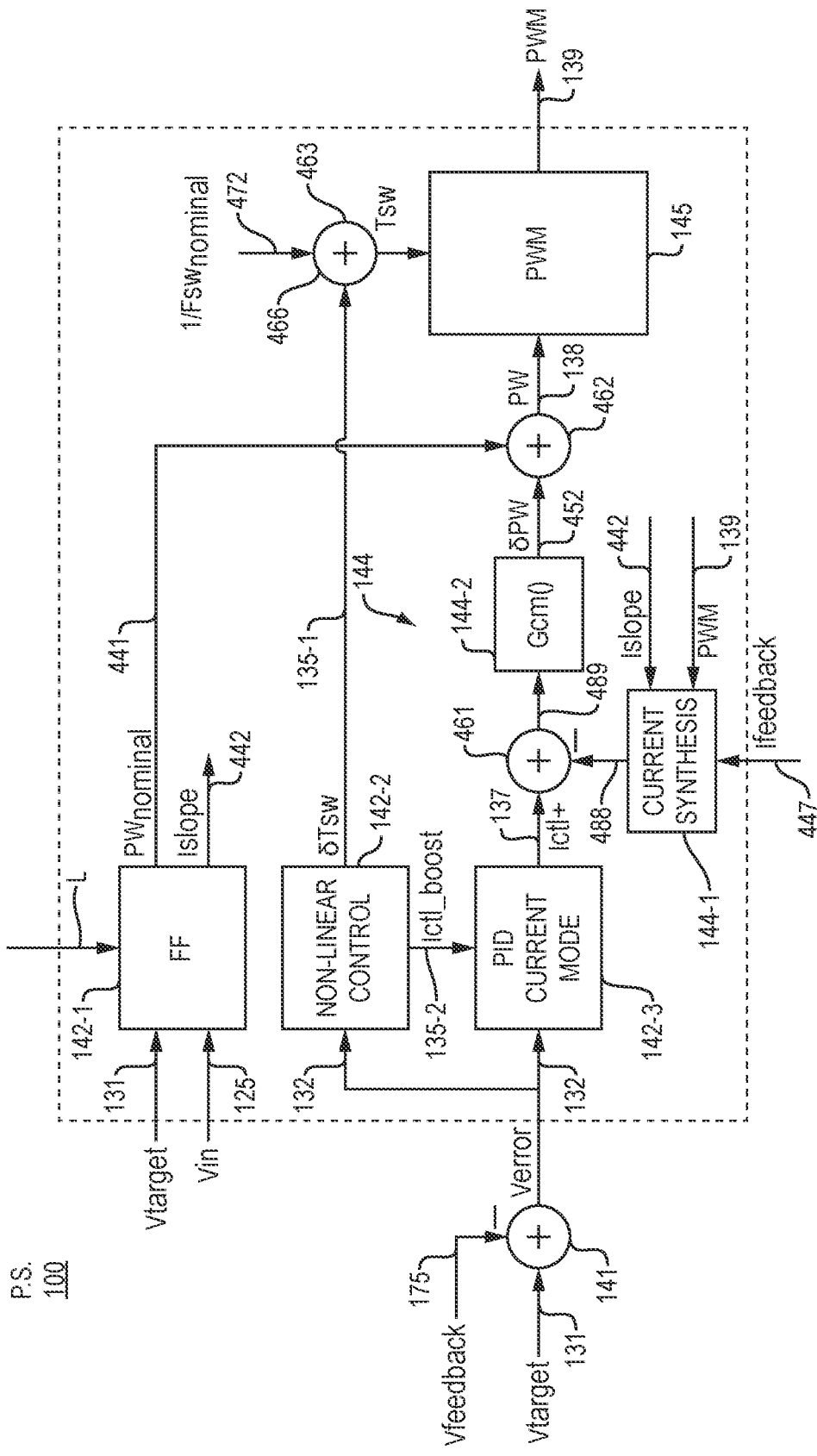
FIG. 4 is an example diagram illustrating a power supply and corresponding power supply controller according to embodiments herein.

FIG. 4 is an example diagram illustrating a power supply and controller according to embodiments herein.

In general, in this example embodiment, the error voltage signal 132 derived from Vtarget (signal 131) and Vfeedback (signal 175) is used to generate a control current signal 137, such as Ictl. The Ifeedback (such as signal 488) is compared to control current (signal 137) to generate Ierror (such as signal 489) that is processed by a filter structure Gcm( ) such as control function 144-2 to produce respective pulse width control information 138 (such as pulse width control information PW). The PWM generator 145 uses the pulse width control information along with Fsw (such as signal 466) to generate PWM pulses 139.

More specifically, non-linear control, triggered by Verror (signal 132), modulates both the Ictl (signal 137) and the Tsw (signal 466), in turn modulating both pulse width and pulse frequency of PWM signals 139.

As shown in this example embodiment, the controller 140 includes summer 141, control function 142-1, control function 142-2, control function 142-3, control function 144, and pulse width modulation generator 145.

During operation, the summer 141 (a.k.a., difference function) produces the error signal 132 based upon a difference between the target voltage signal 131 and the output voltage feedback signal 175 (such as the output voltage 123 or corresponding output voltage feedback signal derived from the output voltage 123). The summer 141 outputs the error voltage signal 132 to both control function 142-2 and control function 142-3.

As further shown in this example embodiment, the control function 144 includes current emulator 144-1, summer 461, control function 144-2, and summer 462.

In one embodiment, the control function 142-1 is a so-called feed forward control function. The control function 142-2 is potentially a non-linear control function supporting non-linear control at times. Although the control function 142-2 can be linear or nonlinear depending on the application.

Control function 142-3 is a PID (such as Proportional-Integral-Derivative) controller or other suitable entity.

The PWM generator 145 produces the PWM control signals 139 depending upon corresponding input control signals such as switching period signal Tsw (a.k.a., signal 466) and pulse width control information 138 (a.k.a., PW).

As its name suggests, the switching period signal Tsw (466) controls a switching frequency of the pulse width modulation signals 139. The pulse width control information 138 controls a duty cycle (pulse width such as switch ON-time and switch OFF-time) of a corresponding switching period of the pulse width modulation signals 139.

As further shown, the control function 142-1 such as a feedforward function receives the target setpoint voltage signal 131 as well as the input voltage 125 (Vin) that is being converted into the output voltage 123. In one embodiment, based on these signals, the control function 142-1 produces a nominal pulse width duration signal 441 (such as pulse width during non-transient conditions).

In one embodiment, the nominal pulse width signal 441 is generally a duty cycle of the target voltage signal 131 divided by the magnitude of the input voltage 125 being converted into the output voltage 123. More specifically, in one embodiment, the nominal pulse width signal 441 is computed as the On time which results in the duty cycle of the On time divided by the switching period approximately matching the nominal duty cycle approximated by the ratio of the target voltage signal 131 to the input voltage 125, which results in the input voltage 125 being converted into the output voltage 123.

Additionally, in one nonlimiting example embodiment, the control function 142-1 receives one or more values (information), L, representing inductances of the corresponding one or more power supply phases driven by the pulse width modulation signals 139. Based at least in part on the information, L, the control function 142-1 produces signals 442 (such as slopes of the inductor current) associated with the one or more power supply phases driven by the pulse width modulation signals 139.

As further shown, the control function 142-2 receives the error voltage signal 132. Based on the error voltage signal 132, the control function 142-2 produces the switching period adjustment signal 135-1 (a.k.a., delta Tsw) and the current adjustment signal 135-2 (such as boost current adjustment signal indicating control adjustments to be implemented during transient load 118 conditions).

Further in this example embodiment, control function 142-2 outputs the switching period adjustment signal 135-1 to the summer 463. The summer 463 (circuitry) adjusts the nominal switching period signal 472 using the switching period adjustment signal 135-1.

For example, in one embodiment, the summer 463 produces the switching period signal 466 (Tsw) as a summation of the nominal switching period signal 472 plus the switching period adjustment signal 135-1 (which may be positive or negative in polarity). As previously discussed, the switching period signal 466 controls a respective switching period (switching frequency) of the pulse width modulation signals 139.

In accordance with further example embodiments, the control function 142-2 produces the switching period adjustment signal 135-1 to increase a switching frequency of the pulse width modulation signals 139 in response to detecting a transient (such as step) increase in output current 149 consumption by the load 118. The control function 142-2 produces the switching period adjustment signal 135-1 to decrease a switching frequency of the pulse width modulation signals 139 in response to detecting a transient (such as step) decrease in output current 149 consumption by the load 118. Such control operations (generation of the switching period adjustment signal 135-1) ensure that a magnitude of the output voltage 123 resides within a voltage tolerance with respect to the target setpoint voltage 131.

As further shown, the control function 142-2, control function 142-3, and control function 144 control a respective duty cycle of generating the pulse width modulation signals 139.

For example, as previously discussed, the control function 142-2 produces the current adjustment signal 135-2 based upon monitoring the error voltage signal 132. In one embodiment, as previously discussed, the current adjustment signal 135-2 is a boost current control signal operative to increase or decrease an amount of output current 149 supplied to the load 118 via pulse width control to accommodate a respective transient current consumption condition.

In accordance with further example embodiments, as further shown, the control function 142-3 receives the error voltage signal 132 as well as the current adjustment signal 135-2 produced by the control function 142-2. The control function 142 (such as a PID current mode control function or other suitable entity) produces the current control signal 137. In one non-limiting example embodiment, as previously discussed, the current control signal 137 indicates a target current value in which to control generation of the output current 149 to power the load 118.

As further shown, the control function 142-3 outputs the current control signal 137 to the summer 461. In addition to receiving the current control signal 137 from the control function 142-3, the summer 461 receives signal 488 indicating a respective (calculated and/or actual) amount of output current 149 supplied by the output current 149 to the load 118.

In one embodiment, the control function 144-1 is a current synthesizer operable to receive feedback information 447 (such as rough measurement of output current 149) indicating a respective amount of output current 149 supplied to the load 118. Additionally, the control function 144-1 receives signal 442 indicating a respective slope (such as Islope from control function 142-1) of the output current 149 and the pulse width modulation control signals 139 generated by the pulse width modulation generator 145. Based on a combination of one or more of the received signals (such as signal 442, pulse width modulation signals 139, feedback signal 447, etc.), the control function 144-1 produces the output current signal 488 indicating an estimated or calculated amount of current supplied by the output current 149 to the load 118.

Note that the implementation of the control function 144-1 as a current synthesizer is shown by way of nonlimiting example. The control function 144-1 can be configured to determine the magnitude of the output current 149 supplied to the load 118 via actual current measurement of the output current 149, simulated measurement of the output current 149, or a combination of both.

Further, the summer 461 receives the current control signal 137 and the output current signal 488. The summer 461 (difference function) produces the error current signal 489 as the difference between the current control signal 137 (target current) and the estimated current as indicated by output current signal 488.

The summer 461 outputs the error current signal 489 to the control function 144-2. Based on one or more attributes (such as slope, magnitude, etc.) of the error current signal 489 as monitored by the control function 144-2, the control function 144-2 produces the pulse width adjustment signal 452.

In one embodiment, the summer 462 produces the pulse width control information 138 based on a summation of the nominal pulse width setting 441 and the pulse width adjustment signal 452 outputted from the control function 144-2. In other words, in one embodiment, the pulse width control information 138 is equal to the nominal pulse width setting 441 plus the pulse width adjustment signal 452.

Thus, in this example embodiment of the power supply 100 in FIG. 4, the power supply controller 140: i) produces a nominal switching period 472; and ii) via summer 463, applies the switching period adjustment signal 135-1 to the nominal switching period 472 to control a switching period Tsw (signal 466) of the pulse width modulation signal 139.

The power supply controller 140 derives pulse width adjustment signal 452 (such as pulse width ON-time adjustment signal 452) based at least in part on the current control signal 137 inputted to the control function 144-2; the power supply controller 140 then varies the pulse width modulation signals 139 based on the switching period adjustment signal 135-1 and the pulse width adjustment signal 452.

The embodiments in FIG. 4 support one or more of the following features:

Multi-loop linear control structure.

Outer loop consists of calculating Verror from Vtarget, Vout_feedback and Vavp_feedback. The Verror is input to the PID/poles. The output is control current Icontrol. This Icontrol is the current needed in all the phases combined to obtain the desired behavior at Vout.

The control current is uniformly scaled down to an Itarget for each individual phase. For each phase, the inductor target phase current is compared with the measured/synthesized inductor current for that corresponding inductor, to produce an Ierror. An inner PI control uses the Ierror to generates a change in pulse-width that modulates the nominal PWM pulse width to generate per phase PWM pulse trains that result in the desired current in that phase.

Non-linear control is triggered by Verror threshold crossings during transient events.

a) Under-voltage transients:
i) Non-linear control modulates the TSW to enable PFM control on top of the linear PWM pulse control
ii) Non-linear control boosts the Icontrol, to accelerate the modulation of Ton in the PWM pulse control to help obtain the desired Vout behavior during a transient.

b) Over-voltage transients: Enables pulse truncation and tri-stating of PWM pulses to help obtain the Vout behavior during a transient.

PWM generator: Pulse controller, combines PWM and PFM control from both linear and non-linear control structures to generate the per phase pulse trains to obtain the desired VR response.

Inductor current sense: Either directly senses the per phase inductor current or emulates it by synthesizing the inductor current.

Figure 5:
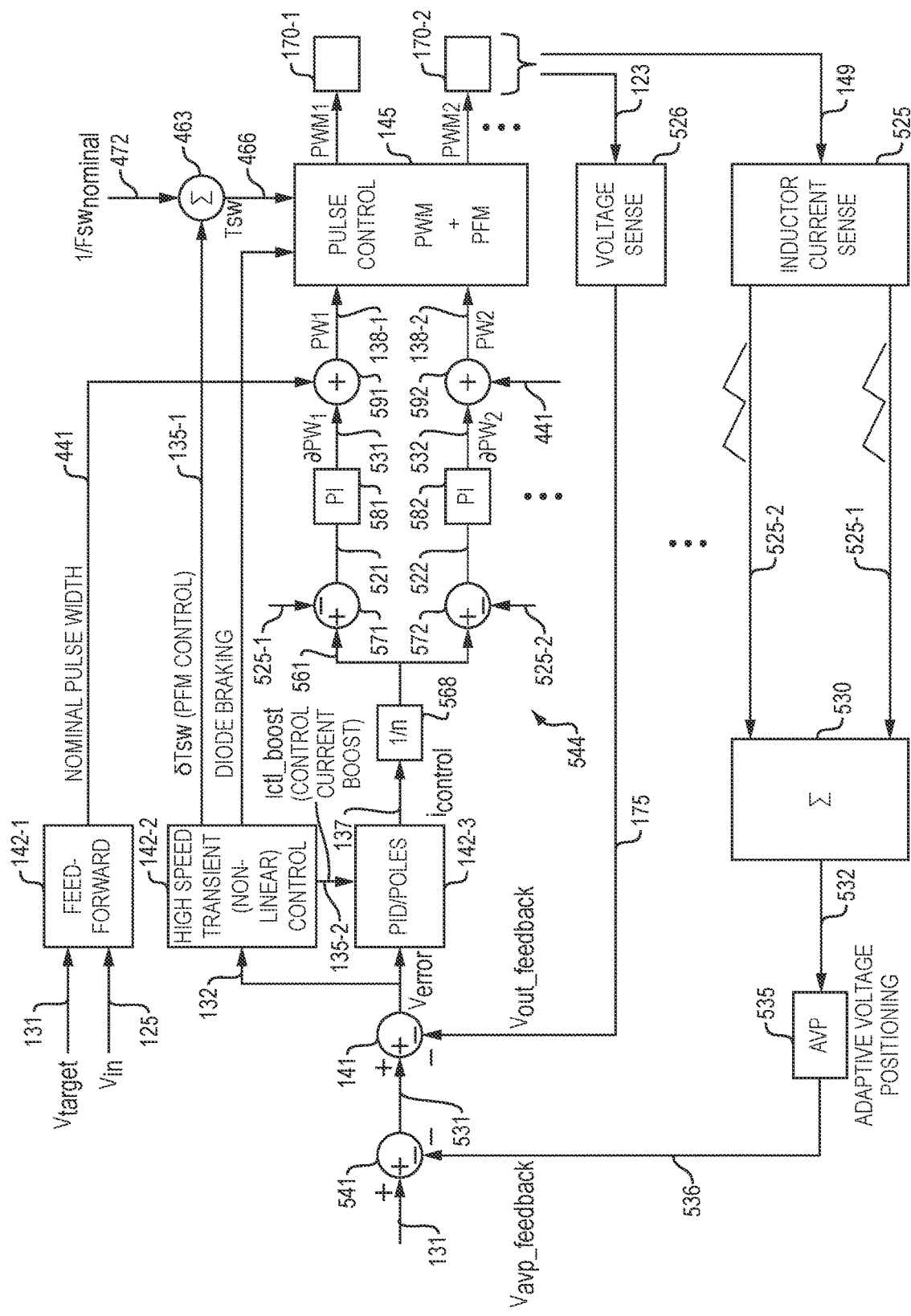
FIG. 5 is an example diagram illustrating a power supply including a power supply controller and multiple phases according to embodiments herein.

FIG. 5 is an example diagram illustrating a power supply including multiple phases according to embodiments herein.

As shown in this example embodiment of power supply 100, the controller 140 includes summer 541, summer 141, control function 142-1 (such as a feedforward function), control function 142-2 (such as high-speed transient non-linear control function), control function 142-3 (such as a PID controller and respective poles), control function 535 (such as adaptive voltage positioning function), control function 544 (such including a PI controller and other components), and pulse width modulation generator 145. Pulse width modulation generator 145 drives the multiple power supply phases 170-1, 170-2, 170-3, etc.

During operation, (inductor) current monitor 525 monitors a respective amount of current supplied by each of the power supply phases through respective inductors (see FIG. 2 and FIG. 3) to the load 118.

The inductor current monitor 525 produces signals 525-1, 525-2, 525-3, etc., each of which are indicative of the magnitude of the current through a respective inductor of the corresponding power supply phase. For example, signal 525-1 indicates an amount of current 149-1 supplied by the power supply phase 170-1 to the load 118; signal 525-2 indicates an amount of current 149-2 supplied by the power supply phase 170-2 to the load 118; and so on.

In one embodiment, the summer function 530 sums the magnitudes of the output current 149-1, 149-2, etc. supplied by each of the phases 170-1, 170-2, etc., to the load 118. Based on the summation via summer function 530, the generated signal 532 indicates a total magnitude of the output current 149 supplied to the load 118. In another embodiment, the summation signal is scaled by the number of phases such that the generated signal indicates the average of the output current supplied to the load by each phase.

The control function 535 such as an adaptive voltage positioning function receives the summation signal 532 (indicative of total output current 149 to load 118) and produces a respective adaptive voltage feedback signal 536 (such as a target voltage adjustment signal). In this example embodiment, the summer 541 produces the adjusted target voltage signal 531 based upon a difference between the target voltage 131 and the adaptive voltage feedback signal 536 (target voltage adjustment signal). Thus, the summer 541 modifies the target voltage 131 based upon the adaptive voltage feedback signal 536.

In one embodiment, the summer 541 outputs the adjusted target voltage signal 531 as equal to the setpoint voltage 131 minus the feedback signal 536.

In a similar manner as previously discussed, the summer 141 (difference function) produces the error voltage signal 132 based upon a difference between the output voltage feedback signal 175 (such as the output voltage 123 or other suitable value supplied by the voltage monitor 526) and the adjusted target voltage signal 531.

The summer 141 outputs the error voltage signal 132 to both control function 142-2 and control function 142-3.

In one embodiment, the control function 142-1 is a feed forward control function.

In one embodiment, the control function 142-2 is a non-linear control function.

Although the control function 142-2 can be linear or nonlinear depending on the application.

In accordance with further example embodiments, control function 142-3 is a PID controller including poles or other circuitry.

As further shown, the control function 142-1 such as a feedforward function receives the target voltage signal 131 as well as the input voltage 125 (such as DC voltage or signal indicating a magnitude of the input voltage 125) that is being converted into the output voltage 123 (such as a DC voltage).

In one embodiment, a magnitude of the input voltage 125 is greater than a magnitude of the output voltage 123.

Based on the received signals, the control function 142-1 produces the nominal pulse width duration signal 441. In one embodiment, the nominal pulse width signal 441 is a duty cycle value such as percentage value or other suitable value indicating a portion of the switching period to activate high side switch circuitry 121-1 in FIG. 2 for each power supply phase. In one embodiment, the nominal pulse width duration signal 142-1 is calculated as the target voltage signal 131 divided by the magnitude of the input voltage 125 being converted into the output voltage 123. The control function 142-1 outputs the nominal pulse width signal 441 to the summers 591, 592, etc.

As further shown, the control function 142-2 receives the error voltage signal 132. Based on the error voltage signal 132, the control function 142-2 produces the switching period adjustment signal 135-1 (a.k.a., delta Tsw supporting frequency control) and the current adjustment signal 135-2 (such as boost current adjustment signal).

Control function 142-2 outputs the switching period adjustment signal 135-1 to the summer 463. The summer 463 (circuitry) adjusts the nominal switching period signal 472 using the switching period adjustment signal 135-1. For example, in one embodiment, the summer 463 produces the switching period signal 466 (Tsw) as a summation of the nominal switching period signal 472 plus the switching period adjustment signal 135-1 (which may be a positive or negative adjustment value).

The PWM generator 145 produces the PWM control signals 139 (such as control signals PWM1, PWM2, etc., for each respective power supply phase) depending upon corresponding input control signals such as switching period signal Tsw (a.k.a., signal 466) and pulse width control information 138 (such as pulse width setting information for each power supply phase).

As its name suggests, and as previously discussed, the switching period signal Tsw (466) controls a switching frequency of the pulse width modulation signals PWM1, PWM2, etc.

As further discussed below, the pulse width control information 138 controls a duty cycle (pulse width such as switch ON-time and switch OFF-time associated with high side switch circuitry and low side switch circuitry in each power supply phase) of the pulse width modulation signals PWM1, PWM2, etc.

In accordance with further example embodiments, the control function 142-2 produces the switching period adjustment signal 135-1 to increase a switching frequency of the pulse width modulation signals PWM1, PWM2, etc., in response to detecting transient increase in output current 149 consumption by the load 118. Conversely, the control function 142-2 produces the switching period adjustment signal 135-1 to decrease a switching frequency of the pulse width modulation signals PWM1, PWM2, etc., in response to detecting transient decrease in output current 149 consumption by the load 118. Such control operations ensure that a magnitude of the output voltage 123 resides within a voltage tolerance range with respect to the target setpoint voltage 131.

As further shown, the control function 142-2, control function 142-3, and control function 544, control a respective duty cycle of generating the pulse width modulation signals for each of the power supply phases.

For example, as previously discussed, the control function 142-2 produces the current adjustment signal 135-2 (such as boost current control signal) based upon monitoring the error voltage signal 132. In one embodiment, the current adjustment signal 135-2 is a boost current control signal operative to increase or decrease an amount of total output current 149 supplied to the load 118 to accommodate a respective transient current consumption condition.

Additionally, note that the control function 142-2 can be configured to produce and supply control signal 555 (such as a so-called diode braking signal) to the pulse width modulation generator 145.

Referring again to generation of the pulse width control information 138, the control function 142-3 receives the error voltage signal 132 as well as the current adjustment signal 135-2 produced by the control function 142-2. In one embodiment, as its name suggests, the current adjustment signal 135-2 controls an amount of current supplied by the power supply phases 170 to the load 118.

As further shown, the control function 142-3 (such as a PID current mode control function) produces the current control signal 137. In one non-limiting example embodiment, the current control signal 137 indicates a target current value in which to control generation of the total output current 149 to power the load 118.

The power supply controller 140 uses the current control signal 137 as a basis to control current supplied by each of the power supply phases to the load 118.

For example, in this example embodiment, the control function 142-3 outputs the current control signal 137 to the control function 568. Control function 568 divides the current control signal 137 by a number of power supply phases 170 that are activated to supply output current to the load 118.

More specifically, in one embodiment, the control function 568 receives the current control signal 137 and divides it by a value, N, to produce the target current signal 561. The value N represents how many of the power supply phases are activated to produce the output voltage 123 and corresponding output current 149.

The control function 568 outputs the target current signal 561 to summer 571 associated with controlling the power supply phase 170-1. Summer 571 produces the error current signal 521 based on a difference between the target current value 561 and the signal 525-1 (amount of output current supplied by phase 170-1 to the load 118). For example, in one embodiment, the error current signal 521 equals the magnitude of the target current value 561 minus a magnitude of the signal 525-1.

Control function 581 (such as a PI controller) monitors one or more attributes (such as magnitude, slope, etc.) of the error current signal 521. Based on one or more attributes (such as slope, magnitude, etc.) of the error current signal 521, the control function 581 produces the pulse width adjustment signal 531 (such as delta PW1 adjustment value) associated with the power supply phase 170-1.

In accordance with further example embodiments, the summer 591 produces the pulse width control information 138-1 (such as PW1) based on a summation of the nominal pulse width setting 441 and the pulse width adjustment signal 531. In other words, in one embodiment, the pulse width information 138-1 (or PW1) is equal to the nominal pulse width setting 441 plus the pulse width adjustment signal 531.

The pulse width modulation generator 145 produces the control signals PWM1 that control the high side switch circuitry and low side switch circuitry in power supply phase 170-1 based on a combination of the pulse width information PW1 and the switching period as indicated by Tsw (signal 466).

The control function 544 supports similar control of each of the power supply phases.

For example, as further shown, the control function 560 outputs the target current signal 561 (or other suitable target signal derived from the current control signal 137) to summer 572 associated with controlling the power supply phase 170-2. Summer 572 produces the error current signal 522 based on a difference between the target current value 561 and the signal 525-2 (measured or estimated amount of output current supplied by phase 170-2 to the load 118). For example, in one embodiment, the error current signal 522 equals the magnitude of the target current value 561 minus a magnitude of the signal 525-2.

Control function 582 monitors one or more attributes (such as magnitude, slope, etc.) of the error current signal 522. Based on one or more attributes (such as slope, magnitude, etc.) of the error current signal 522, the control function 582 produces the pulse width adjustment signal 532 (such as delta PW2 adjustment value) associated with the power supply phase 170-2.

In one embodiment, the summer 592 produces the pulse width information 138-2 (such as PW2) based on a summation of the nominal pulse width setting 441 and the pulse width adjustment signal 532. In other words, in one embodiment, the pulse width information 138-2 (or PW2) is equal to the nominal pulse width setting 441 plus the pulse width adjustment signal 532.

The pulse width modulation generator 145 produces the control signals PWM2 that control the high side switch circuitry and low side switch circuitry in power supply phase 170-2 based on a combination of the pulse width information PW2 and the switching period as indicated by Tsw (signal 466).

In a similar manner, the control function 544 produces pulse width control information 138 for each of the currently active phases, which may change over time depending on how much output current 149 is consumed by the load 118.

Thus, in this example embodiment, the power supply controller 140 derives a respective pulse width adjustment signal 531, 532, etc., (such as pulse width ON-time adjustment signals associated with controlling high side switch circuitry) from the current control signal 137, which indicates a desired target current value to control output current from each power supply phase; the power supply controller 140 then varies the pulse width modulation signals 139 based on the switching period adjustment signal 135-1 and the pulse width adjustment signals 531, 532, etc.

Thus, embodiments herein include individually controlling multiple power supply phases to produce a respective output voltage to power a load.

Figure 6:
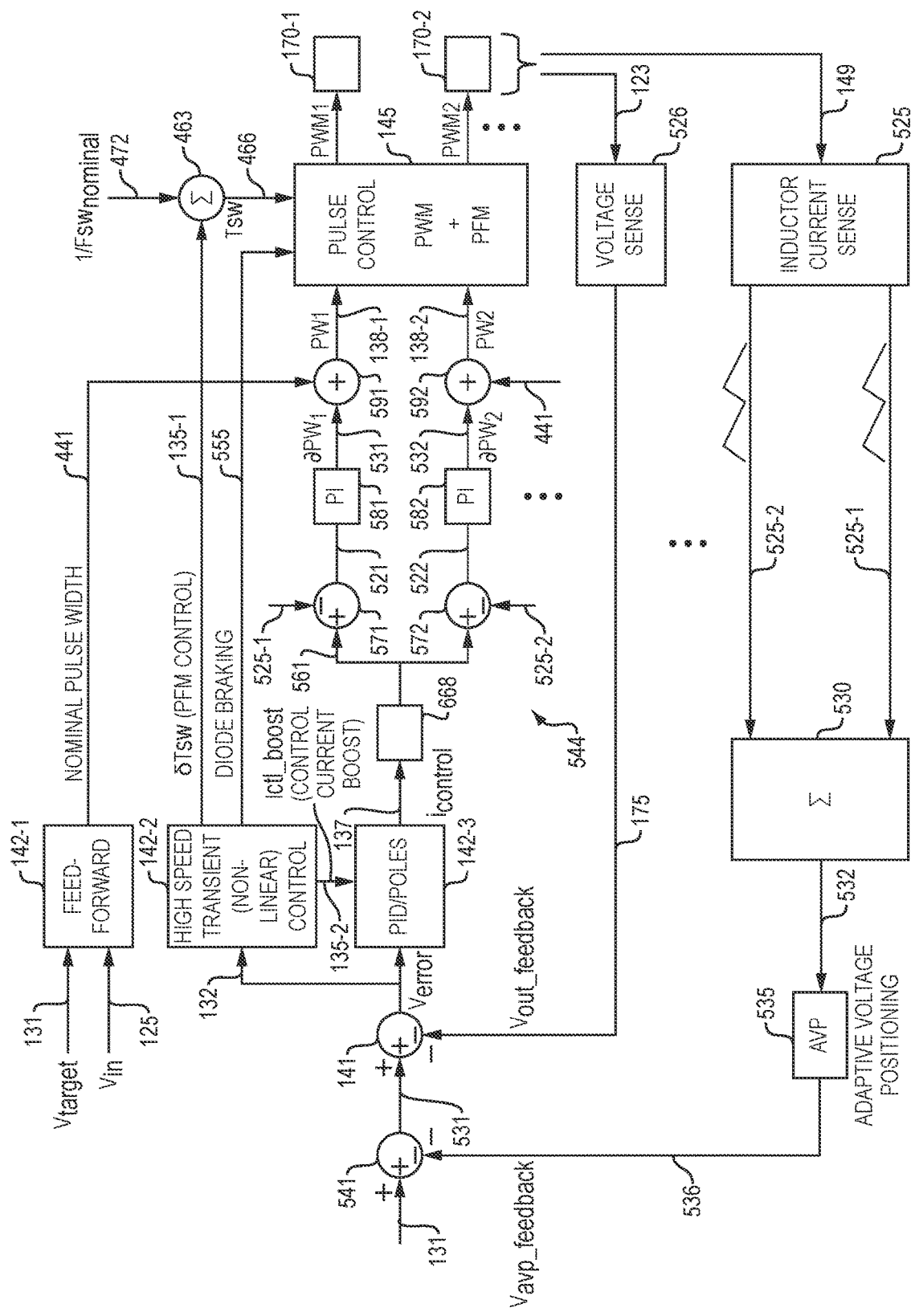
FIG. 6 is an example diagram illustrating a power supply including a power supply controller and multiple phases and target mapping according to embodiments herein.

FIG. 6 is an example diagram illustrating a power supply including multiple phases and target mapping according to embodiments herein.

This example embodiment of the power supply 100 and controller 140 operate in a similar manner as previously discussed with respect to FIG. 5. However, in this example embodiment, the control function 568 in FIG. 5 is replaced with the mapping control function 668 in FIG. 6.

During operation, the mapping control function 668 receives the current control signal 137 such as a target output current value. Depending on the number of activated phases, the mapping control function 668 maps the current control signal 137 to a respective output current target value 661 to summer 571, summer 572, etc.

In a similar manner as previously discussed, each of the summers 571, 572, etc., in the controller 140 produces a respective error current signal 521, 522, etc., that are used as a basis to control a respective pulse width setting of each of the power supply phase 170 in a manner as previously discussed.

Figure 7:
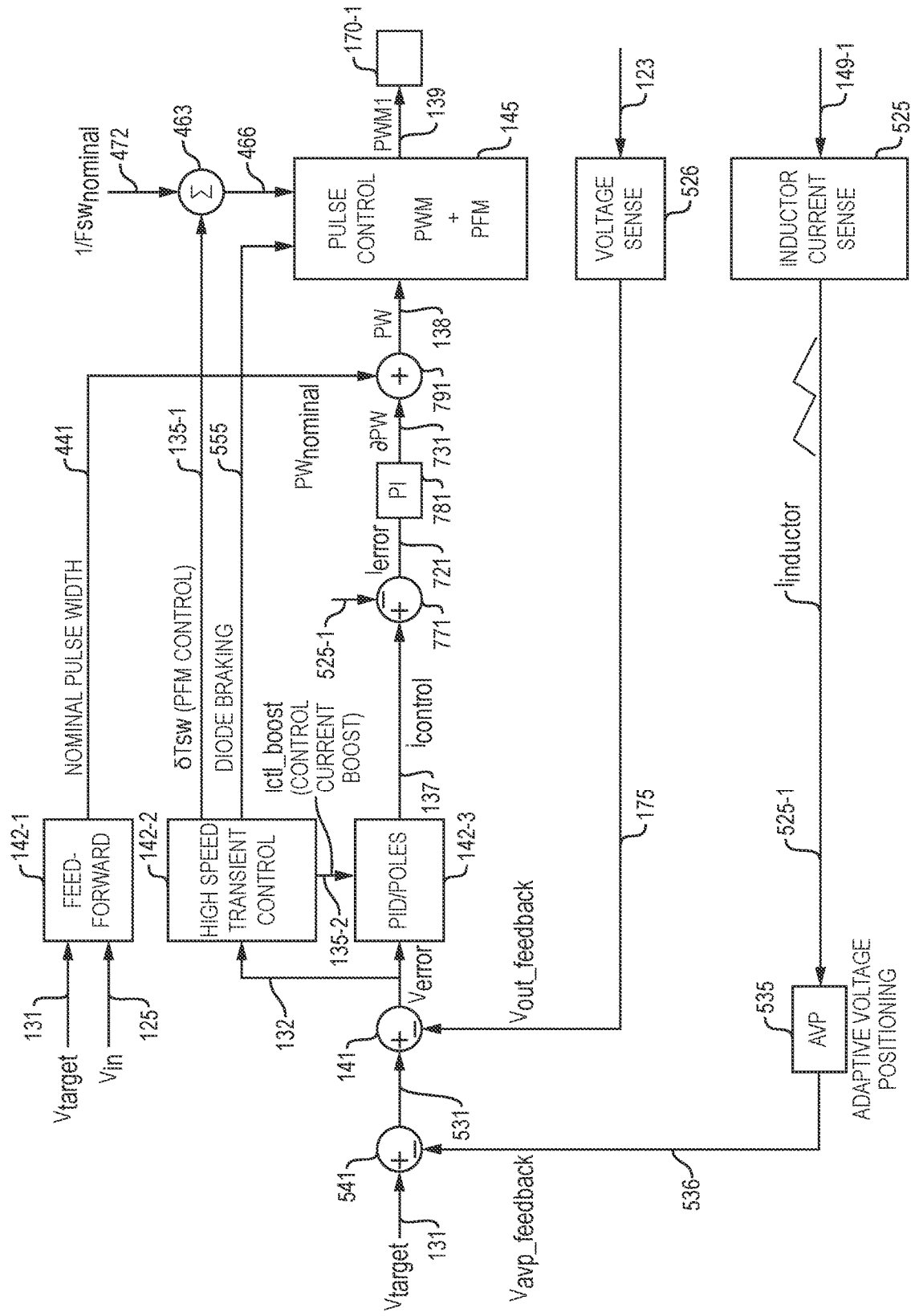
FIG. 7 is an example diagram illustrating a power supply and control of a single phase according to embodiments herein.

FIG. 7 is an example diagram illustrating a power supply and control of a single phase according to embodiments herein.

As shown in this example embodiment of power supply 100, the controller 140 includes summer 541, summer 141, control function 142-1 (such as a feedforward function), control function 142-2 (such as high-speed transient control function), control function 142-3 (such as a PID controller and respective poles), control function 535 (such as adaptive voltage positioning function), control function 781 (such as a PI controller), and pulse width modulation generator 145. Pulse width modulation generator 145 drives the power supply phase 170-1 via generation of the control signal PWM1.

During operation, inductor current monitor 525 monitors a respective amount of current supplied by the output current 149 through inductor 144-1 (see FIG. 2) to the load 118. The inductor current monitor 525 produces signal 525-1 indicative of the magnitude of the current through the respective inductor 144-1.

The control function 535 such as an adaptive voltage positioning function receives the signal 525-1 and produces a respective adaptive voltage feedback signal 536 (such as a target voltage adjustment signal). In this example embodiment, the summer 541 produces the adjusted target voltage signal 531 based upon a difference between the target voltage 131 and the adaptive voltage feedback signal 536 (target voltage adjustment signal).

The summer 141 (difference function) produces the error signal 132 based upon a difference between the output voltage feedback signal 175 (such as the output voltage 123 or derivative signal) supplied by the voltage monitor 526 and the adjusted target voltage signal 531.

The summer 141 outputs the error voltage signal 132 to both control function 142-2 and control function 142-3.

In one embodiment, the control function 142-1 is a feed forward control function.

In one embodiment, the control function 142-2 is a non-linear control function. Although the control function 142-2 can be linear or nonlinear depending on the application.

In accordance with further example embodiments, control function 142-3 is a PID controller and poles or other suitable entity.

As further shown, the control function 142-1 such as a feedforward function receives the target voltage signal 131 as well as the input voltage 125 (such as DC voltage) that is being converted into the output voltage 123 (such as a DC voltage). In one embodiment, a magnitude of the input voltage 125 is greater than a magnitude of the output voltage 123.

Based on the received signals, the control function 142-1 produces the nominal pulse width duration signal 441. In one embodiment, the nominal pulse width signal 441 is a duty cycle value (such as percentage value indicating a portion of the switching period to activate high side switch circuitry 121-1 in FIG. 2) calculated as the target voltage signal 131 divided by the magnitude of the input voltage 125 being converted into the output voltage 123. The control function 142-1 outputs the nominal pulse width signal 441 to the summer 791.

As further shown, the control function 142-2 receives the error voltage signal 132. Based on the error voltage signal 132, the control function 142-2 produces the switching period adjustment signal 135-1 (a.k.a., delta Tsw supporting frequency control) and the current adjustment signal 135-2 (boost current adjustment signal).

Control function 142-2 outputs the switching period adjustment signal 135-1 to the summer 463. The summer 463 (circuitry) adjusts the nominal switching period signal 472 using the switching period adjustment signal 135-1. For example, in one embodiment, the summer 463 produces the switching period signal 466 (Tsw) as a summation of the nominal switching period signal 472 plus the switching period adjustment signal 135-1 (which may be a positive or negative value).

The PWM generator 145 produces the PWM control signals 139 (such as control signal 139-1 and control signal 139-2 in FIG. 2) depending upon corresponding input control signals such as switching period signal Tsw (a.k.a., signal 466) and pulse width control information 138 (such as pulse width setting information).

As its name suggests, the switching period signal Tsw (466) controls a switching frequency of the pulse width modulation signals 139 (PWM1). As further discussed below, the pulse width control information 138 controls a duty cycle (pulse width PW such as switch ON-time and switch OFF-time associated with switches 121-1 and 121-2 in FIG. 2) of the pulse width modulation signals 139 (PWM1).

In accordance with further example embodiments, the control function 142-2 produces the switching period adjustment signal 135-1 to increase a switching frequency of the pulse width modulation signals 139 (PWM1) in response to detecting transient increase in output current 149 consumption by the load 118. Conversely, the control function 142-2 produces the switching period adjustment signal 135-1 to decrease a switching frequency of the pulse width modulation signals 139 in response to detecting transient decrease in output current 149 consumption by the load 118. Such control operations ensure that a magnitude of the output voltage 123 resides within a voltage tolerance range with respect to the target setpoint voltage 131.

As further shown, the control function 142-2, control function 142-3, and control function 781, control a respective duty cycle of generating the pulse width modulation signals 139.

For example, as previously discussed, the control function 142-2 produces the current adjustment signal 135-2 (such as boost current control signal) based upon monitoring the error voltage signal 132. In one embodiment, the current adjustment signal 135-2 is a boost current control signal operative to increase or decrease an amount of output current 149 supplied to the load 118 to accommodate a respective transient change in current consumption by the load 118.

Additionally, note that the control function 142-2 can be configured to produce and supply control signal 555 (such as a diode braking signal) to the pulse width modulation generator 139.

Referring again to generation of the pulse width control information 138, the control function 142-3 receives the error voltage signal 132 as well as the current adjustment signal 135-2 produced by the control function 142-2. In one embodiment, as its name suggests, the current adjustment signal 135-2 controls an amount of current supplied by the power supply phase 170-1 to the load 118.

For example, the control function 142-3 (such as a PID current mode control function) produces the current control signal 137. In one non-limiting example embodiment, the current control signal 137 indicates a target current value in which to control generation of the output current 149 to power the load 118.

The control function 142-3 outputs the current control signal 137 to the summer 771. In addition to receiving the current control signal 137 from the control function 142-3, the summer 771 receives signal 525-1 indicating a respective amount of current supplied by the output current 149 (through inductor 144-1 of FIG. 2) to the load 118. In one embodiment, the current monitor 525 physically measures or estimates the output current 149 via any suitable current sensing method.

Thus, the summer 771 receives the current control signal 137 and the output current signal 525-1. The summer 771 (difference function) produces the error current signal 721 as the difference between the current control signal 137 (such as desired target current) and the measured current as indicated by output current signal 525-1.

The summer 771 outputs the error current signal 721 to the control function 781. Based on one or more attributes (such as slope, magnitude, etc.) of the error current signal 721, the control function 781 produces the pulse width adjustment signal 731 (such as delta PW adjustment value).

In one embodiment, the summer 791 produces the pulse width control information 138 based on a difference between the nominal pulse width setting 441 and the pulse width adjustment signal 731. In other words, in one embodiment, the pulse width control information 138 is equal to the nominal pulse width setting 441 minus the pulse width adjustment signal 731.

Thus, in this example embodiment of the power supply 100 in FIG. 7, the power supply controller 140: i) produces a nominal switching period 472; and ii) via summer 463, applies the switching period adjustment signal 135-1 to the nominal switching period 472 to control a switching period Tsw of the pulse width modulation signals 139 (PWM1).

As previously discussed, the power supply controller 140 derives pulse width adjustment signal 731 (such as pulse width ON-time adjustment signal) from the current control signal 137, which indicates a desired target current value to control output current 149; the power supply controller 140 then varies the pulse width modulation signals 139 based on the switching period adjustment signal 135-1 and the pulse width adjustment signal 731.

Figure 8:
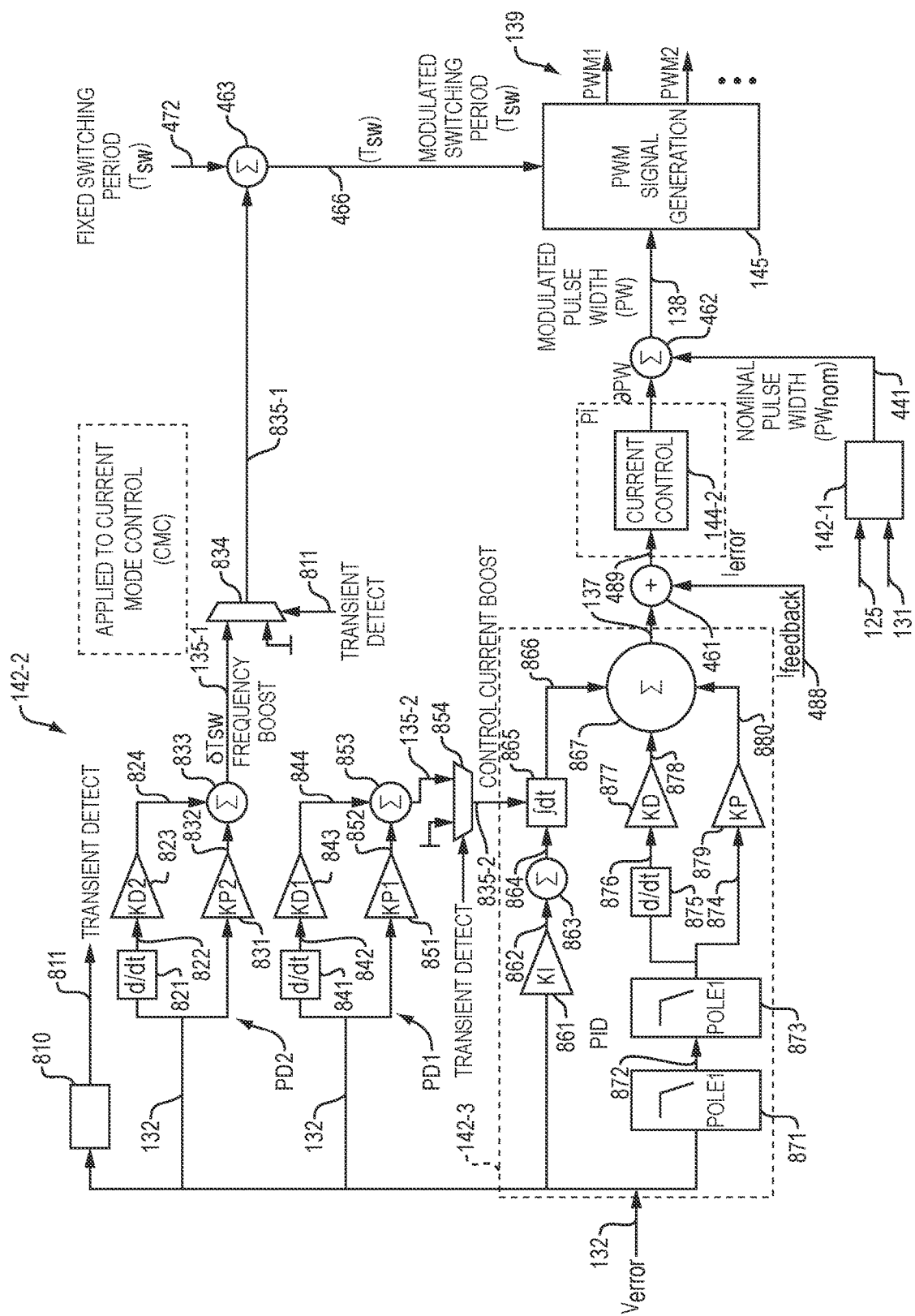
FIG. 8 is an example diagram illustrating a non-linear variable frequency current mode controller according to embodiments herein.

FIG. 8 is an example diagram illustrating a non-linear variable frequency current mode controller according to embodiments herein.

In still further example embodiments, the power supply controller 140 is configured to operate in a non-linear variable frequency current control mode of generating the pulse width modulation signals PWM1, PWM2, etc., based on the error voltage signal 132.

For example, as more specifically shown in FIG. 8, one embodiment of the controller 140 includes transient detection circuit 810, control function 142-1, control function 142-2, control function 142-3, control function 144-2, and pulse width modulation generator 145.

As previously discussed with respect to FIG. 4, during operation, the summer 141 (difference function) produces the error signal 132 based upon a difference between the target voltage signal 131 and the output voltage feedback signal 175 (such as the output voltage 123). The summer 141 outputs the error voltage signal 132 to control function 142-2 and control function 142-3.

Referring again to FIG. 8, in one embodiment, the control function 142-1 is a feed forward control function.

In one embodiment, the control function 142-2 is a non-linear control function. Although the control function 142-2 can be linear or nonlinear depending on the application.

In one embodiment, control function 142-3 is a PID controller or other suitable circuit.

As further shown, the control function 142-1 such as a feedforward function receives the target voltage signal 131 as well as the input voltage 125 is that is being converted into the output voltage 123. Based on these signals, the control function 142-1 produces the nominal pulse width duration signal 441.

In one embodiment, the nominal pulse width signal 441 is a nominal duty cycle of the target voltage signal 131 divided by the magnitude of the input voltage 125 being converted into the output voltage 123. As an example, if the input voltage is 12 VDC and the output voltage is 3 VDC, the duty cycle or nominal duty cycle is 3/12=25% representing the ON time of activating high side switch circuitry for each switching cycle.

As further shown, transient detection circuit 810 receives the error voltage signal 132. Based upon one or more attributes such as magnitude, slope, etc., associated with the error voltage signal 132, the transient detection circuit 810 produces transient detection signal 811 indicating whether or not the load 118 experiences a transient change in a magnitude of current consumption. For example, in one embodiment, if the error voltage signal 132 is above or below a threshold value, the transient detection circuit 810 assumes that the detected condition is caused by the load 118 suddenly consuming a different amount of current. As further discussed below, the transient detection circuit 810 can be configured to generate the signal 811 based on monitoring any of one or more attributes of the error voltage 132 (see FIG. 9).

Referring again to FIG. 8, note again that the power supply controller 140 can be configured to include any number of control functions. For example, in one embodiment, the power supply controller 140 includes a first PD (Proportional-Derivative) controller function PD2 (hardware and/or software) operative to convert the error voltage signal 132 into a switching period adjustment signal 135-1; the power supply controller 140 includes a second PD (Proportional-Derivative) controller function PD1 (such as hardware and/or software) operative to convert the error voltage signal 132 into the current adjustment signal 135-2.

Thus, in one embodiment, the power supply controller 140 implements a first controller function (such as PD1) that produces the current adjustment signal 135-2 from the error voltage signal 132; the power supply controller 140 implements a second controller function (such as PD2) that produces the switching period adjustment signal 135-1 from the error voltage signal 132.

In accordance with more specific example embodiments, control function PD2 includes derivative control function 821, derivative gain function 823 (gain of KD2), proportional gain function 831 (gain of KP2), and summer 833.

During operation, the derivative control function 821 receives the error voltage signal 132 and produces a respective signal 822 indicating a change in the error voltage signal 132 over time. Derivative gain control function 823 applies a respective gain of KD2 to the signal 822 to produce the signal 824.

The proportional gain function 831 applies a gain of KP2 to the error voltage signal 132 to produce the signal 832. The summer 833 of the control function PD2 sums the signal 824 and the signal 832 to produce the switching period adjustment signal 135-1. The summer 833 outputs the switching period adjustment signal 135-1 to the mux 834.

If a transient current consumption condition is detected by the transient detection circuit 810, the signal 811 controls the mux 834 to output the switching period adjustment signal 135-1 (as signal 835-1) to the summer 463. In such an instance, the summer 463 produces the switching period signal 466 (Tsw) to be equal to the switching period 472 minus the switching period adjustment signal 135-1. In other words, the detection of a transient condition by transient detection circuit 810 causes an appropriate change in a respective switching frequency of the pulse width modulation signals 139 (such as PWM1, PWM2, etc.).

If a transient current consumption condition is not detected by the transient detection circuit 810, the signal 811 controls the output signal of the mux 834 to provide a fixed value such as zero to the summer 463. In such an instance, the summer 463 produces the switching period signal 466 (Tsw) to be equal to the nominal switching period 472. In other words, the absence of detecting a transient condition (detecting no transient condition) causes no change in a respective nominal switching frequency of the pulse width modulation signals 139 (such as PWM1, PWM2, etc.).

Further in this example embodiment, control function PD1 includes derivative control function 841, derivative gain function 843, proportional gain function 851, and summer 853.

During operation, the derivative control function 841 receives the error voltage signal 132 and produces a respective signal 842 indicating a change in the error voltage signal 132 over time. Derivative gain control function 843 applies a respective gain of KD1 to the signal 842 to produce the signal 844.

The proportional gain function 851 applies a gain of KP1 to the error voltage signal 132 to produce the signal 852.

The summer 853 of the control function PD1 sums the signal 844 and the signal 852 to produce the current adjustment signal 135-2 (such as current boost signal). The summer 853 outputs the current adjustment signal 135-2 to the mux 854.

If a transient current consumption condition is detected by the transient detection circuit 810, the signal 811 controls the mux 854 to output the current adjustment signal 135-2 (as signal 835-2) to the summer 863.

If a transient current consumption condition is not detected by the transient detection circuit 810, the signal 811 controls the mux 854 to supply a value of zero (via signal 835-2) to the summer 863.

Thus, each of the control function PD1 and control function PD2 receives the error voltage signal 132. Based on the error voltage signal 132, the PD1 control function produces the switching period adjustment signal 135-1 (a.k.a., delta Tsw); the PD2 control function produces the current adjustment signal 135-2 (boost current adjustment signal) to control the pulse width settings of respective one or more pulse width modulation control signals PWM1, PWM2, etc.

More specifically, in one nonlimiting example embodiment, the power supply controller 140 generates the current adjustment signal 135-2 (such as a current boost adjustment signal) and the switching period adjustment signal 135-1 (to be non-zero values) in response to detection of a transient output current 149 supplied by the output voltage 123 to a dynamic load 118. The power supply controller 140 generates the current adjustment signal 135-2 and the switching period adjustment signal 135-1 in response to the error voltage signal 132 being greater than a threshold value or less than a threshold value as detected by the transient detection circuit 810.

In one embodiment, the control function 142-2 produces the switching period adjustment signal 135-1 to increase a switching frequency of the pulse width modulation signals 139 in response to detecting transient increase in output current 149 consumption by the load 118. The control function 142-2 produces the switching period adjustment signal 135-1 to decrease a switching frequency of the pulse width modulation signals 139 in response to detecting transient decrease in output current 149 consumption by the load 118. Such control operations ensure that a magnitude of the output voltage 123 resides within a voltage tolerance with respect to the target setpoint voltage 131.

As further shown, the control function 142-3 (such as a PID control function, where P represents a proportional component of the PID, I represents an integral or integrator component of the PID, D represents a derivative component of the PID) includes a first filter 871 (such as implementing a first pole), second filter 873 (such as implementing a second pole), derivative control function 875, derivative gain function 877, proportional gain function 879, summer 867, integrator gain function 861, summer 863, and integrator control function 865.

During operation, the filter 871 receives the error voltage signal 132 and produces corresponding signal 872; the filter 873 receives the signal 872 and produces corresponding signal 874.

Derivative control function 875 produces signal 876 from the received signal 874. Derivative gain function 877 applies a gain of KD to the signal 876 to produce signal 878.

Proportional gain function 879 applies a gain of KP to the signal 874 to produce the signal 880.

Integrator gain function 861 applies a gain of KI to error voltage signal 132 to produce the signal 862. Summer 863 produces signal 864 as a summation of the signal 862 and signal 835-2 (such as signal 135-2) received from mux 854. Integrator control function 865 integrates signal 864 to produce signal 866.

Finally, summer 867 produces the current control signal 137 (such as target output current value) based on a summation of signal 866, signal 878, and signal 880. The summer 867 of the control function 142-3 outputs the current control signal 137 to the summer 461. In addition to receiving the current control signal 137 from the control function 142-3, the summer 461 receives signal 488 indicating a respective amount of current supplied by the output current 149 to the load 118.

Note again that the signal 488 can be generated based on one or more of: actual measured output current 149 supplied to the load 118, estimated output current 149 supplied to the load 118, etc.

Based on a difference between the current control signal 137 (desired target current) and the actual magnitude of the output current 149 as indicated by the signal 488, the summer 461 outputs the error current signal 489 to the control function 144-2 (such as a PI control function, where P represents a proportional component of the PI controller, I represents an integrator component of the PI controller).

Based on one or more attributes (such as slope, magnitude, etc.) of the error current signal 489, the control function 144-2 produces the pulse width adjustment signal 452 (such as including an adjustment information indicating adjustments to pulse widths of the pulse width modulation signals PWM1, PWM2, etc.) needed to produce the target output current as indicated by the current adjustment signal 137.

In one embodiment, the summer 462 produces the pulse width information 138 based on a difference between the nominal pulse width setting 441 and the pulse width adjustment signal 452 to control a pulse width of each respective power supply phase. As previously discussed, individual circuitry can be used to produce pulse width settings for each of the multiple pulse width modulation signals PWM1, PWM2, etc.

In one embodiment, as previously discussed, the summer 463 produces the switching period setting Tsw (466) based on a difference between the nominal switching period setting 472 and the switching period adjustment signal 135-2 during a detected transient condition.

As further shown, the PWM generator 145 produces the PWM control signals 139 (such as PWM1, PWM2, etc.) depending upon corresponding input control signals such as switching period signal Tsw (a.k.a., signal 466) and pulse width control information 138 (desired pulse width settings for each of the control signals).

Thus, in a similar manner as previously discussed, and as discussed with respect to FIG. 8, the switching period signal Tsw (466) controls a switching frequency of the pulse width modulation signals 139. The pulse width control information 138 controls a duty cycle (pulse width such as switch ON-time and switch OFF-time of corresponding switch circuitry in a respective power supply phase) of the pulse width modulation signals 139 (PWM1, PWM2, etc.).

Thus, according to embodiments herein, a non-linear control mode is triggered during transient events. Transients are detected via detection circuit that look at Verror threshold crossings and/or Verror slope threshold crossings.

During under-voltage transients, Verror is fed through independent PD controls to modulate Fsw: PFM control Ton: PWM control. This is affected by boosting the I-term in the PID's output Icontrol, that in turn controls the PW output of the inner PI loop.

This form of non-linear control is agnostic to control-mode, whether current-mode or voltage-mode.

The current mode control as described herein provides (1) control current boost and (2) frequency boost, it can be made to work in a voltage-control mode to provide (1) duty cycle boost and (2) frequency boost.

In one embodiment, the non-linear control is still based/operates on Verror, making it still a closed loop control.

Figure 9:
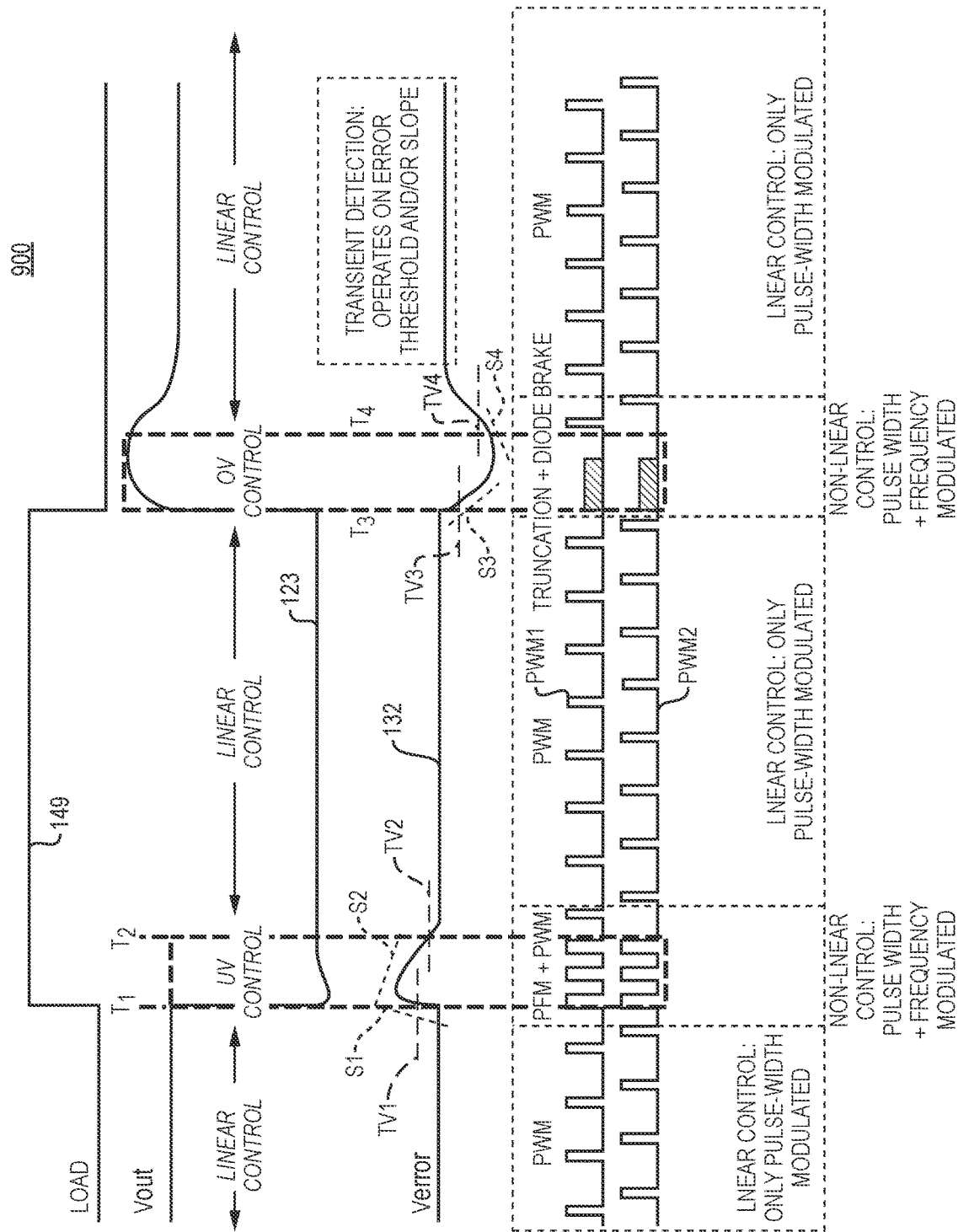
FIG. 9 is an example timing diagram illustrating operation in a linear control mode and non-linear variable frequency control mode according to embodiments herein.

FIG. 9 is an example timing diagram illustrating operation in non-linear variable frequency current mode control according to embodiments herein.

In this example embodiment, the pulse width modulation generator 145 produces the control signals PWM1, PWM2, etc.

The high level state of each of the pulse width modulation control signals PWM1, PWM2, etc., represents an ON-time of the respective phase in which respective high side switch circuitry in the power supply phase is controlled to an ON-state and corresponding low side switch circuitry is set to an OFF-state. The low level state of each of the pulse width modulation control signals PWM1, PWM2, etc., represents an OFF-time of the respective phase in which respective low side switch circuitry in the power supply phase is controlled to an ON-state and corresponding high side switch circuitry is set to an OFF-state.

As shown, prior to time T1, the magnitude of the output current 149 is generally a constant value. A magnitude of the output voltage 123 is generally constant as well.

At or around time T1, a transient load condition occurs in which the load 118 suddenly consumes an additional amount of current. This causes the magnitude of the output voltage 123 to experience a substantial drop, resulting in the change in the error voltage signal 132.

In response to (the transient detection circuit 810 or other suitable entity) detecting one or more condition such as: i) that a magnitude of the error voltage signal 132 is above a magnitude threshold value TV1, ii) that the slope of the error voltage signal 132 is greater than a slope threshold value S1, iii) or a combination of both conditions occurring, the controller 140 as described herein operates in a nonlinear control mode. In such an instance, the transient detection circuit 810 produces the control signal 811 to output signal 135-1 from the mux 834 and output signal 135-2 from mux 854. As discussed herein, this results in adjustments of the pulse widths and switching periods associated with generating the pulse with modulation control signals PWM1, PWM2, etc., to accommodate the transient condition (such as undervoltage condition).

Subsequent to time T1 and before time T2, the controller 140 and corresponding pulse width modulation generator 145 corrects the undervoltage condition as captured by the variation in the magnitude and slope of the error voltage signal 132 settling back to zero after time T1 around time T2. As further shown, at time T2, the controller 140 (and, more specifically, the transient detection circuit 810) detects that the magnitude and/or slope of the error voltage signal is below a respective one or more slope threshold value S2 or magnitude threshold value TV2. This condition causes the controller 142 operate in the non-transient operational mode again (such as signal 835-1 set to zero and signal 835-2 set to 0).

Thus, between times T1 and T2, the controller 140 and corresponding circuitry operate in a nonlinear control mode in which both the pulse widths and frequencies of the pulse width modulation signals are modulated to accommodate the step change and maintain the output voltage 123 within a desired range.

Between times T2 and T3, the controller 140 and corresponding components operate in the linear control mode in which only the pulse widths associated with the control signals PWM1, PWM2, etc., are modulated.

At or around time T3, a transient load condition occurs in which the load 118 suddenly consumes substantially less current. This causes the magnitude of the output voltage 123 to experience a substantial increase in magnitude, resulting in the change in the error voltage signal 132 as shown in time duration 900. In response to (the transient detection circuit 810 or other suitable entity) detecting one or more condition such as: i) that a magnitude of the error voltage signal 132 is below a magnitude threshold value TV3, ii) that the slope of the error voltage signal 132 is negative and an absolute value of the slope of the error voltage signal 132 is greater than a slope threshold value S3, iii) or a combination of both conditions occurring, the controller 140 as described herein operates in a nonlinear control mode. In such an instance, the transient detection circuit 810 produces the control signal 811 to output signal 135-1 from the mux 834 and output signal 135-2 from mux 854. As discussed herein, this results in adjustments to the pulse widths and switching periods associated with generating the pulse with modulation control signals PWM1, PWM2, etc., to accommodate the transient condition (such as overvoltage condition). More specifically, adjustments include truncating pulse widths (such as between time T3 and T4) and potentially implementing a so-called diode breaking mode in which respective switches are set to HI-Z (tri-state) such as between time T3 and time T4.

Subsequent to time T3 and before time T4, via operation in the nonlinear control mode, the controller 140 and corresponding pulse width modulation generator 145 corrects the overvoltage condition as captured by the variation in the magnitude and slope of the error voltage signal 132. As further shown, at time T4, the controller 140 (and, more specifically, the transient detection circuit 810) detects that the magnitude and/or slope of the error voltage signal is below a respective one or more slope threshold value TV4 or magnitude threshold value TV4. This condition causes the controller 142 to operate in the non-transient operational mode (such as linear control mode) again such as signal 835-1 set to zero and signal 835-2 set to 0.

Thus, between times T3 and T4, the controller 140 and corresponding circuitry operate in a nonlinear control mode in which both the pulse widths and frequencies of the pulse width modulation signals are modulated to accommodate the step change and maintain the output voltage 123 within a desired range.

Subsequent to time T4, the controller 140 and corresponding components operate in the linear control mode in which only the pulse widths associated with the control signals PWM1, PWM2, etc., are modulated.

Figure 10:
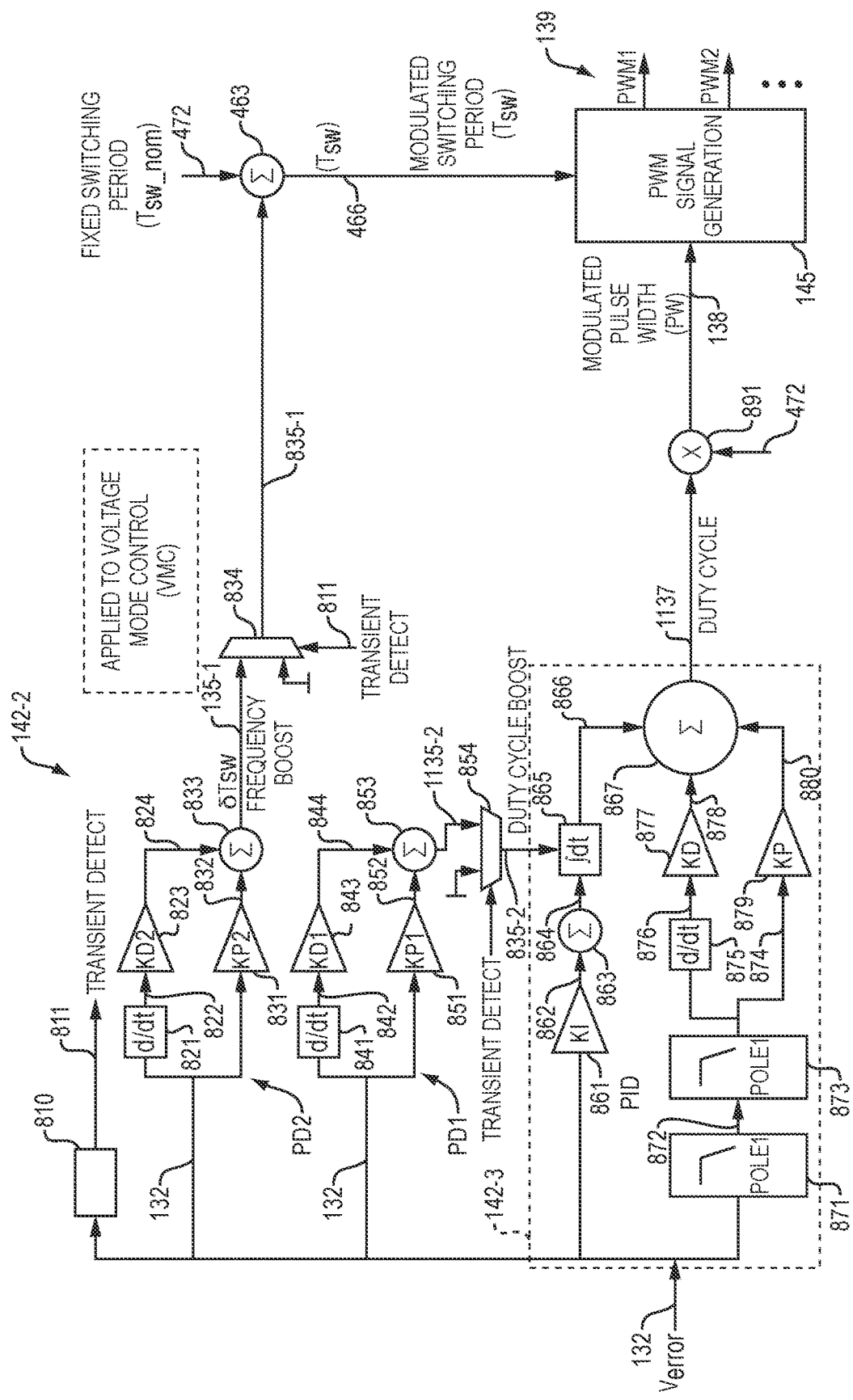
FIG. 10 is an example diagram illustrating a non-linear variable frequency voltage mode controller according to embodiments herein.

FIG. 10 is an example diagram illustrating a non-linear variable frequency voltage mode controller according to embodiments herein.

In still further example embodiments, the power supply controller 140 is configured to operate in a voltage control mode of generating the pulse width modulation signals PWM1, PWM2, etc., based on the error voltage signal 132. In other words, the power supply controller 140 can be configured to operate as a voltage mode controller.

For example, as more specifically shown in FIG. 10, one embodiment of the controller 140 includes transient detection circuit 810, control function 142-2, control function 142-3, control function 144-2, and pulse width modulation generator 145.

As previously discussed with respect to FIG. 4, during operation, the summer 141 (difference function) produces the error signal 132 based upon a difference between the target voltage signal 131 and the output voltage feedback signal 175 (such as the output voltage 123). The summer 141 outputs the error voltage signal 132 to control function 142-2, control function 142-3, and transient detection circuit 810.

Referring again to FIG. 10, in one embodiment, the control function 142-2 is a non-linear control function. Although the control function 142-2 can be linear or non-linear depending on the application.

In one embodiment, control function 142-3 is a PID controller or other suitable circuit.

As further shown, transient detection circuit 810 receives the error voltage signal 132. Based upon one or more attributes such as magnitude, slope, etc., associated with the error voltage signal 132, the transient detection circuit 810 produces transient detection signal 811 indicating whether or not the load 118 experiences a transient change in a magnitude of current consumption. For example, in one embodiment, if the error voltage signal 132 is above or below a threshold value, the transient detection circuit 810 assumes that the detected condition is caused by the load 118 suddenly consuming a different amount of current.

Note again that the power supply controller 140 can be configured to include any number of control functions. For example, in one embodiment, the power supply controller 140 includes a PD (Proportional-Derivative) controller function PD2 (hardware and/or software) operative to convert the error voltage signal 132 into a switching period adjustment signal 135-1; the power supply controller 140 includes a PD (Proportional-Derivative) controller function PD1 (such as hardware and/or software) operative to convert the error voltage signal 132 into the duty cycle adjustment signal 1135-2

Thus, in one embodiment, the power supply controller 140 implements a controller function (such as PD2) that produces the switching period adjustment signal 135-1 from the error voltage signal 132; the power supply controller 140 implements a controller function (such as PD1) that produces the duty cycle adjustment signal 1135-2 from the error voltage signal 132.

In accordance with more specific example embodiments, control function PD2 includes derivative control function 821, derivative gain function 823, proportional gain function 831, and summer 833.

During operation, the derivative control function 821 receives the error voltage signal 132 and produces a respective signal 822 indicating a change in the error voltage signal 132 over time. Derivative gain control function 823 applies a respective gain of KD2 to the signal 822 to produce the signal 824.

The proportional gain function 831 applies a gain of KP2 to the error voltage signal 132 to produce the signal 832.

The summer 833 of the control function PD2 sums the signal 824 and the signal 832 to produce the switching period adjustment signal 135-1. The summer 833 outputs the switching period adjustment signal 135-1 to the mux 834.

If a transient current consumption condition is detected by the transient detection circuit 810, the signal 811 controls the mux 834 to output the switching period adjustment signal 135-1 (as signal 835-1) to the summer 463. In such an instance, the summer 463 produces the switching period signal 466 (Tsw) to be equal to the switching period 472 minus (or plus) the switching period adjustment signal 135-1. In other words, the detection of a transient condition by transient detection circuit 810 causes an appropriate change in a respective switching frequency (via switching period adjustment signal 135-1) of the pulse width modulation signals 139 (such as PWM1, PWM2, etc.). If a transient current consumption condition is not detected by the transient detection circuit 810, the signal 811 controls the output signal of the mux 834 to provide a value of zero to the summer 463. In such an instance, the summer 463 produces the switching period signal 466 (Tsw) to be equal to the nominal switching period 472. In other words, the absence of detection of a transient condition causes no change in a respective nominal switching frequency used to produce the pulse width modulation signals 139 (such as PWM1, PWM2, etc.).

Further in this example embodiment, control function PD1 includes derivative control function 841, derivative gain function 843, proportional gain function 851, and summer 853.

During operation, the derivative control function 841 receives the error voltage signal 132 and produces a respective signal 842 indicating a change in the error voltage signal 132 over time. Derivative gain control function 843 applies a respective gain of KD1 to the signal 842 to produce the signal 844.

The proportional gain function 851 applies a gain of KP1 to the error voltage signal 132 to produce the signal 852.

The summer 853 of the control function PD1 sums the signal 844 and the signal 852 to produce the duty cycle adjustment signal 1135-2 (such as current boost signal). The summer 853 outputs the duty cycle adjustment signal 1135-2 to the mux 854.

If a transient current consumption condition is detected by the transient detection circuit 810, the signal 811 controls the mux 854 to output the duty cycle adjustment signal 1135-2 (as signal 835-2) to the summer 863.

If a transient current consumption condition is not detected by the transient detection circuit 810, the signal 811 controls the mux 854 to supply a value of zero to the summer 863. Details of summer 863 and control function 142-3 are further discussed below.

Thus, each of the control function PD1 and control function PD2 receives the error voltage signal 132. Based on the error voltage signal 132, the PD1 control function produces the switching period adjustment signal 135-1 (a.k.a., delta Tsw) and the PD2 control function produces the duty cycle adjustment signal 1135-2 to control the pulse width settings of respective one or more pulse width modulation control signals PWM1, PWM2, etc.

In one embodiment, the control function 142-2 produces a magnitude and/or polarity of the switching period adjustment signal 135-1 to increase a switching frequency of the pulse width modulation signals 139 in response to detecting transient increase in output current 149 consumption by the load 118. The control function 142-2 produces a magnitude and/or polarity of the switching period adjustment signal 135-1 to decrease a switching frequency of the pulse width modulation signals 139 in response to detecting a transient decrease in output current 149 consumption by the load 118. Such control operations ensure that a magnitude of the output voltage 123 resides within a voltage tolerance with respect to the target setpoint voltage 131.

As further shown, the control function 142-3 (such as a PID control function, where P represents a proportional component of the PID, I represents an integral or integrator component of the PID, D represents a derivative component of the PID) includes a first filter 871 (such as implementing a first pole), second filter 872 (such as implementing a second pole), derivative control function 875, derivative gain function 877, proportional gain function 879, summer 867, integrator gain function 861, summer 863, and integrator control function 865.

During operation, the filter 871 receives the error voltage signal 132 and produces corresponding signal 872; the filter 873 receives the signal 872 from filter 872 and produces corresponding signal 874.

Derivative control function 875 produces signal 876 from the received signal 874. In one embodiment, the signal 876 represents a change in the signal 874 over time. Derivative gain function 877 applies a gain of KD to the signal 876 to produce signal 878.

Proportional gain function 879 applies a gain of KP to the signal 874 to produce the signal 880.

Integrator gain function 861 applies a gain of KI to error voltage signal 132 to produce the signal 862.

Summer 863 produces signal 864 as a summation of the signal 862 and signal 835-2 (such as signal 1135-2) received from mux 854. Integrator control function 865 integrates signal 864 to produce signal 866.

Finally, summer 867 produces the duty-cycle control signal 1137 based on a summation of signal 866, signal 878, and signal 880.

The summer 867 of the control function 142-3 outputs the duty-cycle control signal 1137 to the multiplier function 891.

In addition to receiving the duty-cycle control signal 1137 from the control function 142-3, the multiplier 891 receives nominal switching period signal 472.

Based on multiplication of the duty-cycle control signal 1137 (such as associated with the target current setting for the output current 149) and the nominal switching period 472, the multiplier 891 produces respective pulse width control information 138 such as indicating settings of pulse width settings for each of the pulse width modulation control signals PWM1, PWM2, etc.

As further shown, the PWM generator 145 produces the PWM control signals 139 (such as PWM1, PWM2, etc.) depending upon corresponding input control signals such as switching period signal Tsw (a.k.a., signal 466) and pulse width control information 138 (desired pulse width settings) for each of the control signals.

Thus, in a similar manner as previously discussed, and as discussed with respect to FIG. 10, the switching period signal Tsw (466) controls a switching frequency (or switching period) of the pulse width modulation signals 139. The pulse width control information 138 controls a duty cycle (pulse width such as switch ON-time and switch OFF-time of corresponding switch circuitry in a respective power supply phase) of the pulse width modulation signals 139 (PWM1, PWM2, etc.).

Figure 11:
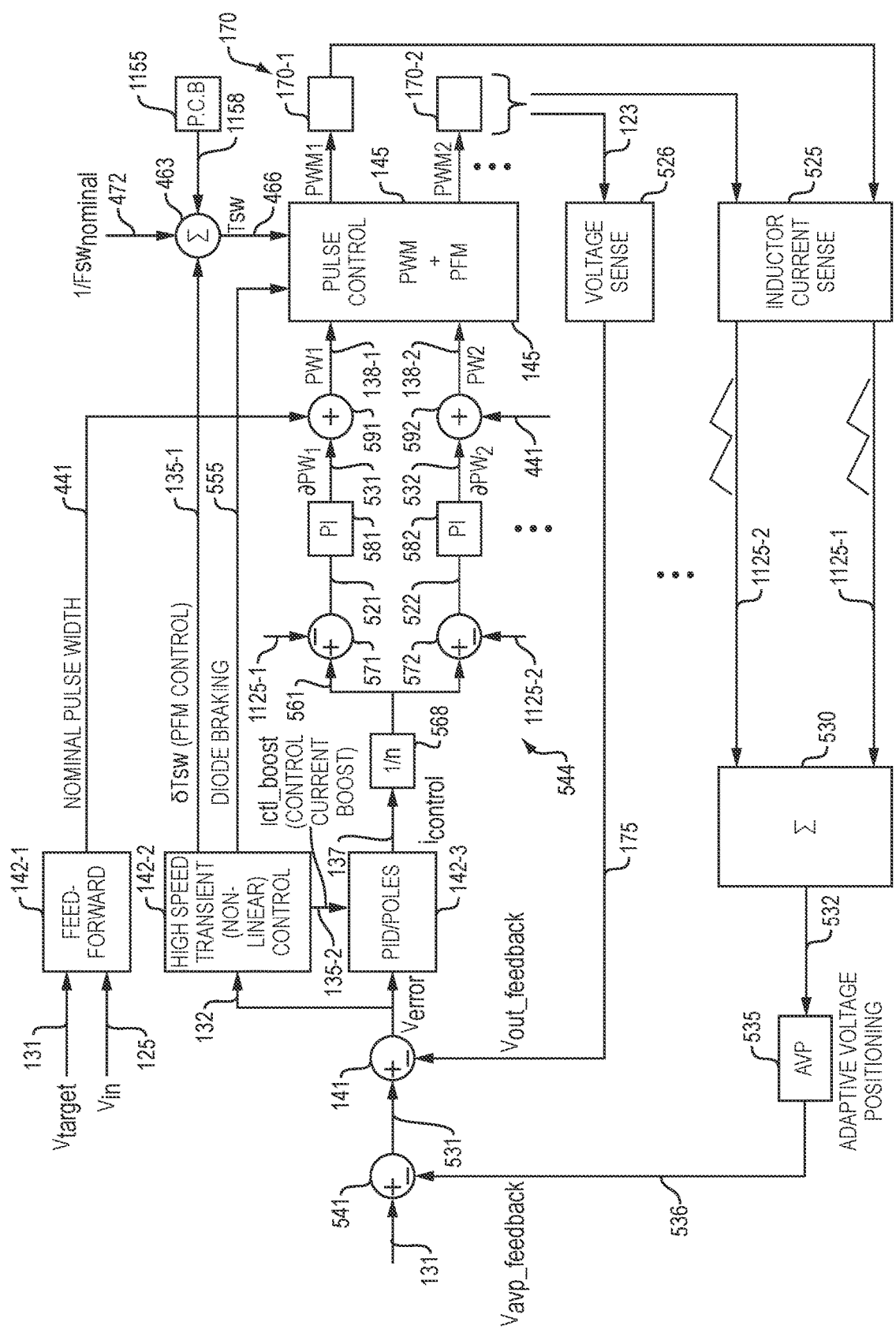
FIG. 11 is an example diagram illustrating current mode control using emulated inductor current and optional phase current balancing according to embodiments herein.

FIG. 11 is an example diagram illustrating current mode control using emulated inductor current according to embodiments herein.

As shown in this example embodiment of power supply 100, the controller 140 includes summer 541, summer 141, control function 142-1 (such as a feedforward function), control function 142-2 (such as high-speed transient non-linear control function), control function 142-3 (such as a PID controller and respective poles), control function 535 (such as adaptive voltage positioning function), control function 544 (such including one or more PI control functions and other components), and pulse width modulation generator 145.

Pulse width modulation generator 145 drives the multiple power supply phases 170-1, 170-2, 170-3, etc., with respective control signals PWM1, PWM2, PWM3, etc.

During operation, inductor current monitor 525 (such as an inductor current sense circuit and/or synthesizer) monitors (such as emulates, calculates, synthesizes, measures, simulates, etc.) a respective amount of current supplied by each of the power supply phases through respective inductors (see FIG. 2 and FIG. 3) to the load 118.

The inductor current monitor 525 produces signals 1125-1, 1125-2, 1125-3, etc., each of which are indicative of the magnitude of the current through a respective inductor of the corresponding power supply phase. For example, signal 1125-1 indicates an estimated/calculated amount of current 149-1 supplied by the power supply phase 170-1 to the load 118; signal 1125-2 indicates an estimated/calculated amount of current 149-2 supplied by the power supply phase 170-2 to the load 118; and so on.

In one embodiment, the summer function 530 sums the magnitudes of the output current 149-1, 149-2, etc., supplied by each of the phases 170-1, 170-2, etc., to the load 118. Based on the summation, the generated signal 532 indicates a total magnitude of the output current 149 supplied to the load 118.

The control function 535 such as an adaptive voltage positioning function receives the summation signal 532 (indicative of total output current 149 to load 118) and produces a respective adaptive voltage feedback signal 536 (such as a target voltage adjustment signal).

Further in this example embodiment, the summer 541 receives the setpoint voltage 131 and the feedback signal 536 and produces the adjusted target voltage signal 531 based upon a difference between the target voltage 131 and the adaptive voltage feedback signal 536 (target voltage adjustment signal). In other words, in one embodiment, the summer 541 outputs the adjusted target voltage signal 531 as equal to the setpoint voltage 131 minus the feedback signal 536. Thus, the summer 541 modifies the original target voltage 131 based upon the adaptive voltage feedback signal 536.

Note that the control function 535 can be configured to adjust a magnitude of the feedback signal depending on a magnitude of the output current 149 as indicated via the generated signal 532.

In a similar manner as previously discussed, the summer 141 (difference function) produces the error voltage signal 132 based upon a difference between the output voltage feedback signal 175 (such as the output voltage 123 or other suitable value supplied by the voltage monitor 526) and the adjusted target voltage signal 531.

The summer 141 outputs the error voltage signal 132 to both control function 142-2 and control function 142-3.

In one embodiment, the control function 142-1 is a feed forward control function.

In one embodiment, the control function 142-2 is a non-linear control function. Although the control function 142-2 can be linear or nonlinear depending on the application.

In accordance with further example embodiments, control function 142-3 is a PID controller including poles or other circuitry.

As further shown, the control function 142-1 such as a feedforward function receives the target voltage signal 131 as well as the input voltage 125 (such as DC voltage) that is being converted into the output voltage 123 (such as a DC voltage). In one embodiment, a magnitude of the input voltage 125 is greater than a magnitude of the output voltage 123.

Based on the received signals (such as target voltage 131 and the input voltage 125), the control function 142-1 produces the nominal pulse width duration signal 441. In one embodiment, the nominal pulse width signal 441 is a duty cycle value such as representing a percentage value or other suitable value indicating a portion of a respective switching period to activate high side switch circuitry 121-1 in FIG. 2 for each power supply phase.

Referring again to FIG. 11, in one embodiment, the nominal pulse width duration signal 441 is calculated as the target voltage signal 131 divided by the magnitude of the input voltage 125 being converted into the output voltage 123. The control function 142-1 outputs the nominal pulse width signal 441 to each of the summers 591, 592, etc.

As further shown, the control function 142-2 receives the error voltage signal 132. Based on the error voltage signal 132, the control function 142-2 produces the switching period adjustment signal 135-1 (a.k.a., delta Tsw supporting frequency control) and the current adjustment signal 135-2 (such as boost current adjustment signal).

Control function 142-2 outputs the switching period adjustment signal 135-1 to the summer 463. The summer 463 (circuitry) adjusts the nominal switching period signal 472 using the switching period adjustment signal 135-1. For example, in one embodiment, the summer 463 produces the switching period signal 466 (Tsw) as a summation of the nominal switching period signal 472 plus the switching period adjustment signal 135-1 (which may be a positive or negative adjustment value). The switching period signal 466 is a period (or 1/period=switching frequency) of each respective control cycle of producing the pulse width modulation signals PWM1, PWM2, etc.

The PWM generator 145 produces the PWM control signals 139 (such as control signals PWM1, PWM2, etc., for each respective power supply phase) depending upon corresponding input control signals such as switching period signal Tsw (a.k.a., signal 466) and pulse width control information 138 (such as pulse width setting information PW1, PW2, PW3, etc., for associated with the power supply phases). In one embodiment, the settings of the pulse width values PW1, PW2, PW3, etc., change over time depending on changes in a magnitude of the output current 149 supplied to the load 118.

As its name suggests, and as previously discussed, the switching period signal Tsw (466) controls a switching frequency of the pulse width modulation signals PWM1, PWM2, etc. As further discussed below, the pulse width control information 138 controls a duty cycle (pulse width such as switch ON-time and switch OFF-time associated with high side switch circuitry and low side switch circuitry in each power supply phase) of the pulse width modulation signals PWM1, PWM2, etc.

In accordance with further example embodiments, the control function 142-2 produces the switching period adjustment signal 135-1 to increase a switching frequency of the pulse width modulation signals PWM1, PWM2, etc., in response to detecting transient increase in output current 149 consumption by the load 118. Conversely, the control function 142-2 produces the switching period adjustment signal 135-1 to decrease a switching frequency of the pulse width modulation signals PWM1, PWM2, etc., in response to detecting transient decrease in output current 149 consumption by the load 118. Such control operations ensure that a magnitude of the output voltage 123 resides within a voltage tolerance range with respect to the target setpoint voltage 131.

As further shown, the control function 142-2, control function 142-3, and control function 544, control a respective duty cycle of generating the pulse width modulation signals for each of the power supply phases.

For example, as previously discussed, the control function 142-2 produces the current adjustment signal 135-2 (such as boost current control signal) based upon monitoring the error voltage signal 132. In one embodiment, the current adjustment signal 135-2 is a boost current control signal operative to increase or decrease an amount of total output current 149 supplied to the load 118 to accommodate a respective transient current consumption condition.

Additionally, note that the control function 142-2 can be configured to produce and supply control signal 555 (such as a so-called diode braking signal) to the pulse width modulation generator 145.

Referring again to generation of the pulse width control information 138 (such as PW1, PW2, PW3, etc.), the control function 142-3 receives the error voltage signal 132 as well as the current adjustment signal 135-2 produced by the control function 142-2. In one embodiment, as its name suggests, the current adjustment signal 135-2 controls an amount of current supplied by the power supply phases 170 to the load 118.

As further shown, the control function 142-3 (such as a PID current mode control function) produces the current control signal 137. In one non-limiting example embodiment, the current control signal 137 indicates a target current value in which to control generation of the total output current 149 to power the load 118.

The power supply controller 140 uses the current control signal 137 as a basis to control current supplied by each of the power supply phases to the load 118.

For example, in this example embodiment, the control function 142-3 outputs the current control signal 137 to the control function 568. Control function 568 divides the current control signal 137 by a number of power supply phases 170 that are activated to supply output current to the load 118.

In one embodiment, the control function 568 receives the current control signal 137 and divides it by a value, N, to produce the target current signal 561. In one embodiment, the value N represents how many of the power supply phases are activated to produce the output voltage 123 and corresponding output current 149.

The control function 568 outputs the target current signal 561 to summer 571 associated with controlling the power supply phase 170-1. Summer 571 produces the error current signal 521 based on a difference between the target current value 561 and the signal 1125-1 (calculated amount of output current supplied by phase 170-1 to the load 118). For example, in one embodiment, the error current signal 521 equals the magnitude of the target current value 561 minus a magnitude of the signal 1125-1.

Control function 581 (such as a PI controller) monitors one or more attributes (such as magnitude, slope, etc.) of the error current signal 521. Based on one or more attributes (such as slope, magnitude, etc.) of the error current signal 521, the control function 581 produces the pulse width adjustment signal 531 (such as delta PW1 adjustment value) associated with the power supply phase 170-1.

In accordance with further example embodiments, the summer 591 produces the pulse width information 138-1 (such as PW1) based on a difference between the nominal pulse width setting 441 and the pulse width adjustment signal 531. In other words, in one embodiment, the pulse width information 138-1 (or PW1) is equal to the nominal pulse width setting 441 plus the pulse width adjustment signal 531.

The pulse width modulation generator 145 produces the control signals PWM1 that control the high side switch circuitry and low side switch circuitry in power supply phase 170-1 based on a combination of the pulse width information PW1 and the switching period (switching frequency) as indicated by Tsw (signal 466).

The control function 544 supports similar control of each of the power supply phases.

For example, as further shown, the control function 568 outputs the target current signal 561 to summer 572 associated with controlling the power supply phase 170-2. Summer 572 produces the error current signal 522 based on a difference between the target current value 561 and the signal 1125-2 (calculated or estimated amount of output current supplied by phase 170-2 to the load 118). For example, in one embodiment, the error current signal 522 equals the magnitude of the target current value 561 minus a magnitude of the signal 1125-2.

Control function 582 monitors one or more attributes (such as magnitude, slope, etc.) of the error current signal 522. Based on one or more attributes (such as slope, magnitude, etc.) of the error current signal 522, the control function 582 produces the pulse width adjustment signal 532 (such as delta PW2 adjustment value) associated with the power supply phase 170-2.

In one embodiment, the summer 592 produces the pulse width information 138-2 (such as PW2) based on a difference between the nominal pulse width setting 441 and the pulse width adjustment signal 532. In other words, in one embodiment, the pulse width information 138-2 (or PW2) is equal to the nominal pulse width setting 441 plus the pulse width adjustment signal 532.

The pulse width modulation generator 145 produces the control signals PWM2 that control the high side switch circuitry and low side switch circuitry in power supply phase 170-2 based on a combination of the pulse width information PW2 and the switching period as indicated by Tsw (signal 466).

In a similar manner, the control function 544 produces pulse width control information 138 for each of the currently active phases, which may change over time depending on how much output current 149 is consumed by the load 118.

Thus, in this example embodiment, the power supply controller 140 derives a respective pulse width adjustment signal 531, 532, etc., (such as pulse width ON-time adjustment signals associated with controlling high side switch circuitry) from the current control signal 137, which indicates a desired total target current value to control output current from each power supply phase; the power supply controller 140 then varies the pulse width modulation signals 139 based on the switching period adjustment signal 135-1 and the pulse width adjustment signals.

Thus, embodiments herein include individually controlling multiple power supply phases to produce a respective output voltage to power a load.

As further shown, the power supply 100 in FIG. 11 optionally includes phase current balancer 1155. As previously discussed, the first power supply phase 170-1 supplies first output current 149-1 to the load 118; the second power supply phase 170-2 supplies second output current 149-2 to the load 118.

Based on a magnitude of the first output current 149-1, a magnitude of the second output current 149-2, a magnitude of the third output current 149-3, etc., the phase current balancer 1155 (such as a current monitor) balances each of the output currents via adjustment of a switching frequency (as indicated by signal 466) of operating each of the first power supply phase 170-1, second power supply phase 170-2, third power supply phase 170-3, etc. For example, in response to the phase current balancer 1155 detecting an undesirable imbalance in a magnitude of the first output current 149-1, the second output current 149-2, third output current 149-3, etc., the phase current balancer changes a switching frequency of operating the power supply 100 via adjustments to the switching frequency (switching period signal 466).

More specifically, in one embodiment, in response to detecting the imbalance, the phase current balancer 1155 inputs adjustment signal 1156 into the summer 463. The adjustment signal 463 causes a change in the switching frequency (switching period as indicated by signal 466), resulting in a change in the magnitudes of the output currents 149-1, 149-2, 149-3, etc., from each of the respective power supply phases 170-1, 170-2, 170-3, etc.

In general, the current mode control as described herein intrinsically balances phase current in the inductors of corresponding power supply phases. This ensures low speed phase current balance.

In one embodiment, one issue is that during high-frequency current consumption oscillations, as the oscillation rate approaches the PWM switching rate, some power supply phases can get locked into delivering more power than others, resulting in phase current imbalance. As previously discussed, this high frequency/speed imbalance is corrected using a high-speed phase balancer (phase current balancer 1155) that modifies the switching period 466 if individual phase current associated with each of the power supply phases begins to diverge from each other.

Figure 12:
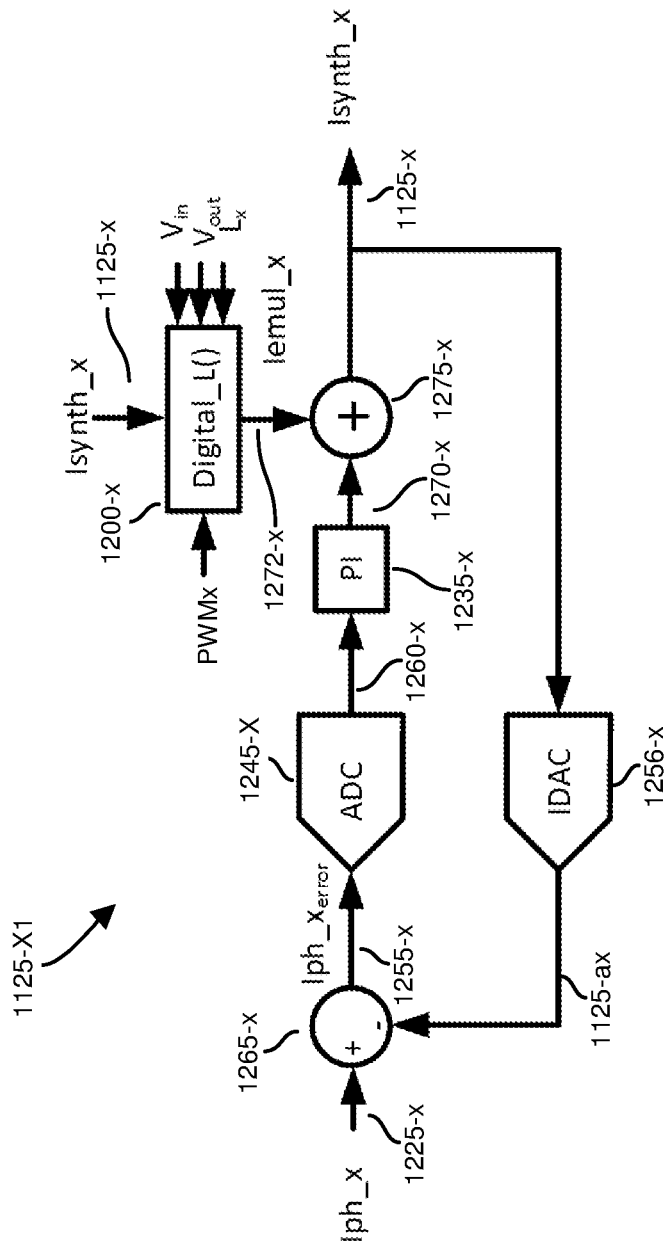
FIG. 12 is an example diagram illustrating current emulation according to embodiments herein.

FIG. 12 is an example diagram illustrating current emulation according to embodiments herein.

In one embodiment, as shown in FIG. 11, synthesized inductor currents are used in an inner PI control function loop to compare against control current from a PID control function or other suitable entity. Synthesized inductor current is generated from correcting an emulated current waveform. Emulated inductor current is generated by using previous synthesized value and calculating the change in inductor current based on one or more parameters such as current PWM state, Vin, Vout and inductor value Lx associated with the respective power supply phase.

More specifically, in this example embodiment in FIG. 11, the monitor system 1125 includes a respective current monitor function 1125-X1 (one circuit for each power supply phase) to monitor/determine/calculate current supplied by each of the respective power supply phases 170-1, 170-2, etc., and produce a respective synthesized current value

1125-$x$, where x is an integer such as 1, 2, 3, 4, etc., corresponding to the power supply phases 170-1, 170-2, 170-3, etc.

In this example embodiment, the output signal 1125-$x$ (such as output signal 1125-1 for power supply phase 170-1 when x=1, such as 1125-2 for power supply phase 170-2 when x=2, such as 1125-3 for power supply phase 170-1 when x=3, etc.) represents the amount of estimated current supplied by corresponding phase X to the load 118. Digital-to-analog converter 1256-$x$ receives the output signal 1125-$x$ and converts it from a digital signal to analog signal 1125-Ax supplied to summer 1265-$x$.

Input signal 1225-$x$ represents a raw measured current 149-$x$ (measured in any suitable manner) associated with the corresponding phase x.

The summer 1265-$x$ receives the analog signal 1125-$ax$ and a sample of the measured phase current 1225-$x$ associated with phase x. The summer 1265-$x$ produces the phase current error signal 1255-$x$ based on a difference between the newly received sample of the measured phase current 1225-$x$ and the phase current error signal 1125-$ax$ for the phase x.

As further shown, the analog-to-digital converter 1245-$x$ converts the received phase current error signal 1255-$x$ into analog phase current error signal 1260-$x$ supplied to the control function 1235-$x$.

Control function 1235-$x$ (such as a PI controller function, transfer function, filter function, or other suitable entity) converts the analog phase current error signal 1260-$x$ into respective signal 1270-$x$.

Note further that current monitor function 1125-X1 also includes emulator 1200-$x$. The emulator 1200-$x$ generates the emulated current signal 1272-$x$ based on one or more values such as a prior sample of the synthesized current value 1125-$x$, pulse width modulation control signals PWMx, input voltage 125 (Vin), output current 123 (Vout), and inductance Lx of a respective phase inductor 144-$x$.

The summer 1275-$x$ produces the current sample current 1125-$x$ (such as Isynth-x) based on a sum of the signal 1270-$x$ and respective sample of the emulated current signal 1272-$x$.

Thus, embodiments herein include the current monitor function 1125-X1: i) receiving a current measurement signal (such as signal 1225-$x$) approximating a magnitude of the output current supplied by the power supply phase to the load, and ii) deriving the actual current signal 1125-$x$ based at least in part from the phase current input signal 1225-$x$.

Figure 13:
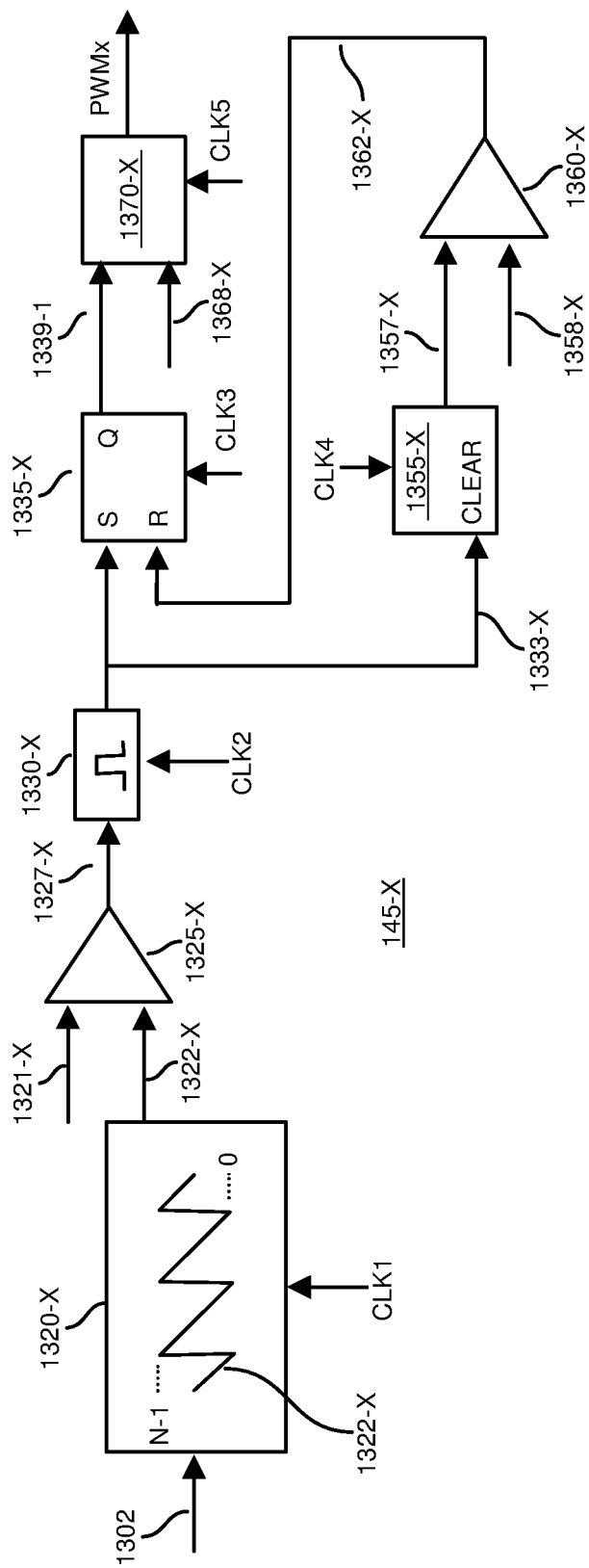
FIG. 13 is an example diagram illustrating a dual edge pulse width modulation controller according to embodiments herein.

FIG. 13 is an example diagram illustrating a dual edge pulse width modulation controller according to embodiments herein.

Dual edge PWM as in FIG. 13 provides a fastest response for both under-voltage and over-voltage transient load (current consumption) conditions. For example, embodiments herein include a fast leading edge response for under-voltage transients and fast trailing edge response for over-voltage transients.

As further discussed below, Rampx (a.k.a., signal 1322-$x$) is output from the ramp generator counter 1320-$x$ for phase x. As previously discussed, x is an integer value indicating one power supply phase 170-1, power supply phase 170-2, etc. The duration of Ramp period associated with signal 1322-$x$ is determined by the switching frequency (1/Tsw) provided by summer 463.

PWx (such as PW1, PW2, etc.) represents a respective pulse width setting for phasex and is generated by the PID/non-linear control functions (such as control function 544 or other suitable entity) as previously discussed.

In one embodiment, signal PWMx goes high when Rampx (signal 1322-$x$ generated by counter 1320-$x$) crosses signal 1321-$x$ (N/2+PWx/2). At such time, the second counter 1355-$x$ (counter 2) is started, which counts up to setting PWx. After the PWx count is reached, the PWMx signal reset to a logic low. In one embodiment, the optional interpolator 1370-$x$ is used to obtain PWMx ON times of finer resolution than allowed by the one or more system clocks (such as CLK1, CLK2, CLK3, etc.).

More specifically, in one nonlimiting example embodiment, the PWM generator 145 is configured to include a respective pulse width modulation generator function 145-$x$ for each of the multiple phases x=1, 2, 3, etc. That is, each pulse width modulation generator function 145-$x$ includes a counter 1320-$x$, comparator 1325-$x$, one-shot signal generator 1330-$x$, SR flip-flop 1335-$x$, counter 1355-$x$, comparator 1360-$x$, and interpolator 1370-$x$.

The PWM generator function 145-$x$ in this example embodiment is counter based. For example, the input parameter Fsw (switching frequency 1302) control frequency is equal to 1/SWperiod, where the period is equal to signal 466 (Tsw). The counter 1320-$x$ operates off clock CLK1. During operation, the counter 1320-$x$ is reset to a value of N−1 counts at the beginning of each switching period. The counter 1320-$x$ decrements to zero by the end of a respective switching period as indicated by signal 1302.

The comparator 1325-$x$ compares a magnitude of the ramp signal 1322-$x$ produced by the counter 1320-$x$ to a threshold value 1321-$x$ such as N/2+PWx/2, where N/2 represents a midpoint of the switching period, and where PWx/2 is the pulse width setting produced for the respective $x^{th}$ power supply phase divided by 2.

The ramp signal 1322-$x$ starts at the count value of N−1 at the beginning of a switching period and decrements to 0 by the end of the switching period (as indicated by signal 466). In one embodiment, the value of pulse width settings PW are normalized with respect to the value N. For example, the pulse width settings PW settings range from a value of 0 to N.

In such an instance, a pulse width setting PWx set to a value of N indicates a 100% duty cycle in which to activate the high side switch circuitry of a respective phase; a pulse width setting PWx set to a value of 0.75*N indicates a 75% duty cycle in which to activate the high side switch circuitry of a respective phase; a pulse width setting PWx set to a value of 0.5*N indicates a 50% duty cycle in which to activate the high side switch circuitry of a respective phase; a pulse width setting PWx set to a value of 0.2*N indicates a 20% duty cycle in which to activate the high side switch circuitry of a respective phase; and so on.

Thus, in this example embodiment, the comparator 1325-$x$ changes a logic state of the control signal 1327-$x$ (such as produces a rising or falling edge) when the ramp signal 1322-$x$ is less than a magnitude of the signal 1321-$x$ such as N/2+PWx/2, where N/2 is an offset and the pulse width setting PWx is divided by 2.

In this example embodiment, the output 1327-$x$ (such as corresponding edge) from the comparator 1325-$x$ causes the one shot signal generator 1330-$x$ to produce output 1333-$x$, which sets the SR flip-flop 1335-$x$ (sets Q=logic high) and clears the on-time counter 1355-$x$ (the PWMx signal controls the on-time duration Ton associated with high side switch circuitry of the respective phase x).

As further shown, when the comparator 1360-$x$ detects that the count value 1357-$x$ produced by the on-time counter 1355-$x$ equals or exceeds a respective threshold value 1358-$x$ (such as signal PWx), the comparator 1360-$x$ produces the respective control signal 1362-x to reset the SR flip-flop 1335-x, causing the pulse with control signal 1339-1 to a logic low again.

In one embodiment, the optional interpolator 1370-x, based on signal 1368-x and control signal 1339-1, fine tunes control of the control signal PWMx to a logic low state, resulting in turning OFF respective high side switch circuitry in phase X and turning on low side switch circuitry in respective phase x.

Note that operation of the PWM generator function 145-x for a respective phase x repeats every control cycle such that input Fsw sets the switching period the generated PWMx control signals; the threshold level 1358-x (such as pulse width control information PWx) sets/controls the pulse width and the effective duty cycle of the pulse with modulation control signal PWMx. Details of generating a respective pulse width modulation control signals PWMx is shown in FIG. 14.

Figure 14:
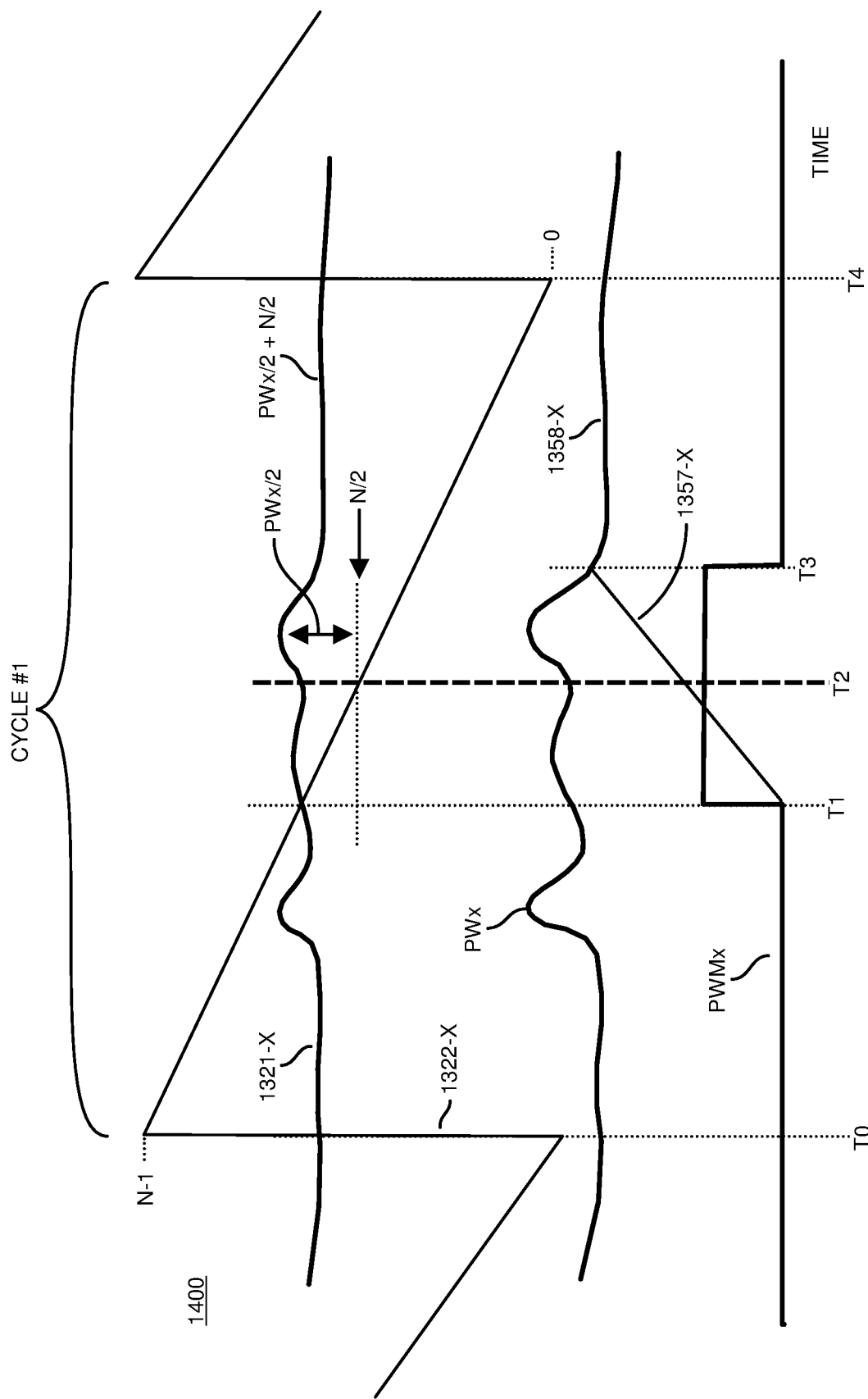
FIG. 14 is an example timing diagram illustrating dual edge pulse width modulation according to embodiments herein.

FIG. 14 is an example timing diagram illustrating dual edge pulse width modulation according to embodiments herein.

In this embodiment, as shown in time diagram 1400, the counter 1320-x produces ramp signal 1322-x in a manner as previously discussed. For example, for control cycle #1, the ramp signal 1322-x starts at a count of N−1 at time T0 and decrements over the corresponding switching period (Tsw) to zero at time T4, at which point the ramp signal 1322-x is reset to a value of N−1 again.

As previously discussed, the controller 140 varies a switching frequency of the pulse width modulation signals PWMx based on a magnitude of the error voltage 132. Thus, in one embodiment, the pulse width modulation signals PWx and PWMx vary over time.

In further example embodiments, the pulse width modulation generator function 145-x derives a pulse width signal PWx from the pulse width setting information 138. The pulse width signal PWx represents/captures an amount of time in which to activate high side switch circuitry in the corresponding power supply phase x to convert the input voltage 125 into the output voltage 123. As shown in FIG. 14, the magnitude of the pulse width setting information 138 (such as value PWx) for phase x varies over time within a respective control cycle #1.

As further shown, in one embodiment, the signal PWx/2 is offset by a value of N/2 to produce signal 1321-x (such as PWx/2+N/2). The offset N/2 generally biases the pulse width ON portion of the PWMx signal towards the center of the control cycle #1.

As previously discussed, the comparator 1325-x compares a magnitude of the ramp signal 1322-x to the signal 1321-x (such as PWx/2+N/2). In response to detecting that the magnitude of the ramp signal 1322-x is less than the signal 1321-x (such as PWx/2+N/2) at time T1, the pulse width modulation generator function 145-x transitions the PWMx control signal from a logic low to a logic high. Thus, the magnitude of the control signal PWx controls a leading edge of activating respective high side switch circuitry associated with phase x.

Further, as previously discussed, signal 1357-x ramps up at time T1. The comparator 1360-x compares a magnitude of the ramp signal 1357-x to the signal 1358-x (such as PWx). In response to detecting that the magnitude of the signal 1358-x (such as PWx) is less than the signal 1357-x generated by the counter 1355-x at time T3, the pulse width modulation generator function 145-x transitions the PWMx control signal from a logic high to a logic low at time T3.

Thus, the pulse width modulation generator function 145-x controls the trailing edge of control signal PWMx at time T3.

In one embodiment, the controller 140 activates respective high side switch circuitry associated with phase x between time T1 and T3 to an ON state based on the magnitude of the control signal PWx. The controller 140 deactivates respective low side switch circuitry associated with phase x between time T1 and T3 to an OFF state based on the magnitude of the control signal PWx.

The controller 140 activates respective low side switch circuitry associated with phase x to an ON state between time T0 and T1 and between time T3 and T4. The controller 140 deactivates respective high side switch circuitry associated with phase x to an OFF state between time T0 and T1 and between time T3 and T4.

Note that, in one embodiment, the magnitude of the pulse width setting PWx varies during the pulse width ON-time (such as between time T1 and T3) of the pulse width modulation signal PWMx. For example, in one embodiment, a magnitude of the pulse width setting PWx at the leading edge (such as at time T1) of the pulse width modulation signal PWMx for a first control cycle #1 is a first pulse width value; the magnitude of the pulse width setting PWx at the trailing edge (such as at time T3) of the pulse width modulation signal PWMx for the first control cycle is a second pulse width value. In this example embodiment, the second pulse width value (such as magnitude of PWx at time T3) is different than the first pulse width value (such as magnitude of PWx at time T1). These variations in the pulse width signals PWx and corresponding novel control provided by the pulse width modulation generator function 145-x based on the magnitude of the pulse width setting for phases x provides faster response times to accommodate transient load conditions.

As previously discussed, yet further example embodiments herein include producing an error current signal based on a difference between a magnitude of output current supplied from a power supply phase to a load and a phase current setpoint. Based on the magnitude of the error current signal, the controller 140 controls a pulse width setting PWx of a pulse width modulation signal PWMx controlling the respective power supply phase x. As previously discussed, the controller 140 varies a leading edge and a falling edge of the pulse width on-time (such as between time T1 and time T3) of the pulse width modulation signal PWMx over each of multiple control cycles depending on variations in the magnitude of the pulse width setting PWx.

Figure 15:
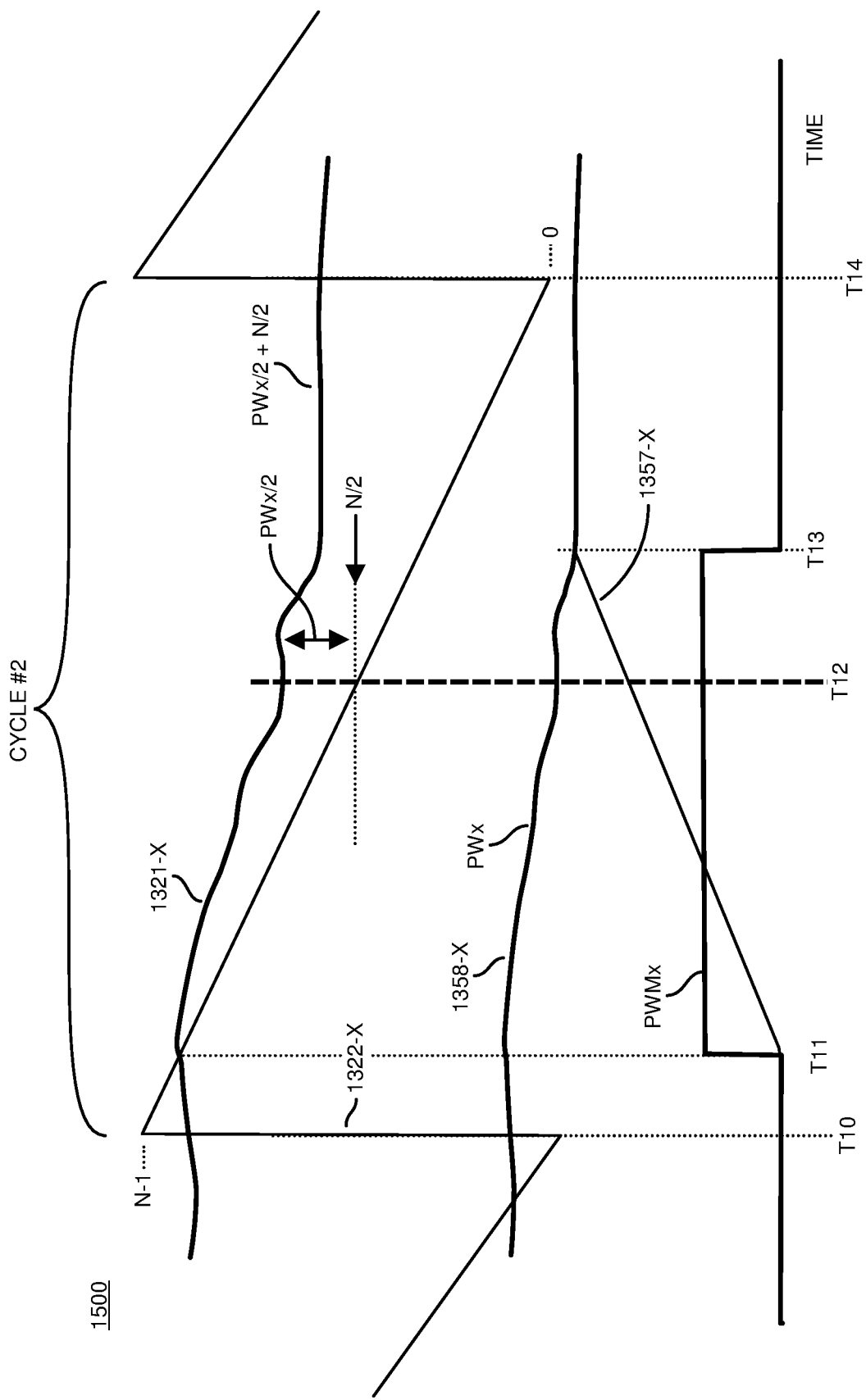
FIG. 15 is an example timing diagram illustrating dual edge pulse width modulation according to embodiments herein.

FIG. 15 is an example timing diagram illustrating dual edge pulse width modulation according to embodiments herein.

In this embodiment, as shown in time diagram 1500, the counter 1320-x produces ramp signal 1322-x. For control cycle #2, the ramp signal 1322-x starts at a count of N−1 at time T10 and decrements over the corresponding switching period (Tsw) until time T14, at which point the ramp signal 1322-x is reset from zero to a value of N−1 again.

As further shown, the signal PWx/2 is offset by a value of N/2 to produce signal 1321-x (such as PWx/2+N/2). The offset value N/2 generally biases the pulse width ON portion of the PWMx signal towards the center of the control cycle #2.

As previously discussed, the comparator 1325-x compares a magnitude of the ramp signal 1322-x to the signal 1321-x (such as PWx/2+N/2). In response to detecting that the magnitude of the ramp signal 1322-x is less than the signal 1321-x (such as PWx/2+N/2) at time T11, the pulse width modulation generator function 145-x transitions the PWMx control signal from a logic low to a logic high. Thus, the magnitude of the control signal PWx controls a leading edge of activating respective high side switch circuitry associated with phase x.

Further, as previously discussed, signal 1357-*x* starts ramping at time T11. The comparator 1325-*x* compares a magnitude of the signal 1357-*x* (from counter 1355-*x*) to the signal 1358-*x* (such as PWx). In response to detecting that the magnitude of the signal 1358-*x* (such as PWx) is less than or equal to the signal 1357-*x* generated by the counter 1355-*x* at time T13, the pulse width modulation generator function 145-*x* transitions the PWMx control signal from a logic high to a logic low. Thus, the magnitude of the control signal PWx controls the trailing leading edge at time T13 of activating respective high side switch circuitry associated with phase x.

As previously discussed, in one embodiment, the controller 140 activates respective high side switch circuitry associated with phase x between time T11 and T13 to an ON state based on the magnitude of the control signal PWx. The controller 140 deactivates respective low side switch circuitry associated with phase x between time T11 and T13 to an OFF state based on the magnitude of the control signal PWx.

The controller 140 activates respective low side switch circuitry associated with phase x to an ON state between time T10 and T11 and between time T13 and T14. The controller 140 deactivates respective high side switch circuitry associated with phase x to an OFF state between time T10 and T11 and between time T13 and T14.

Figure 16:
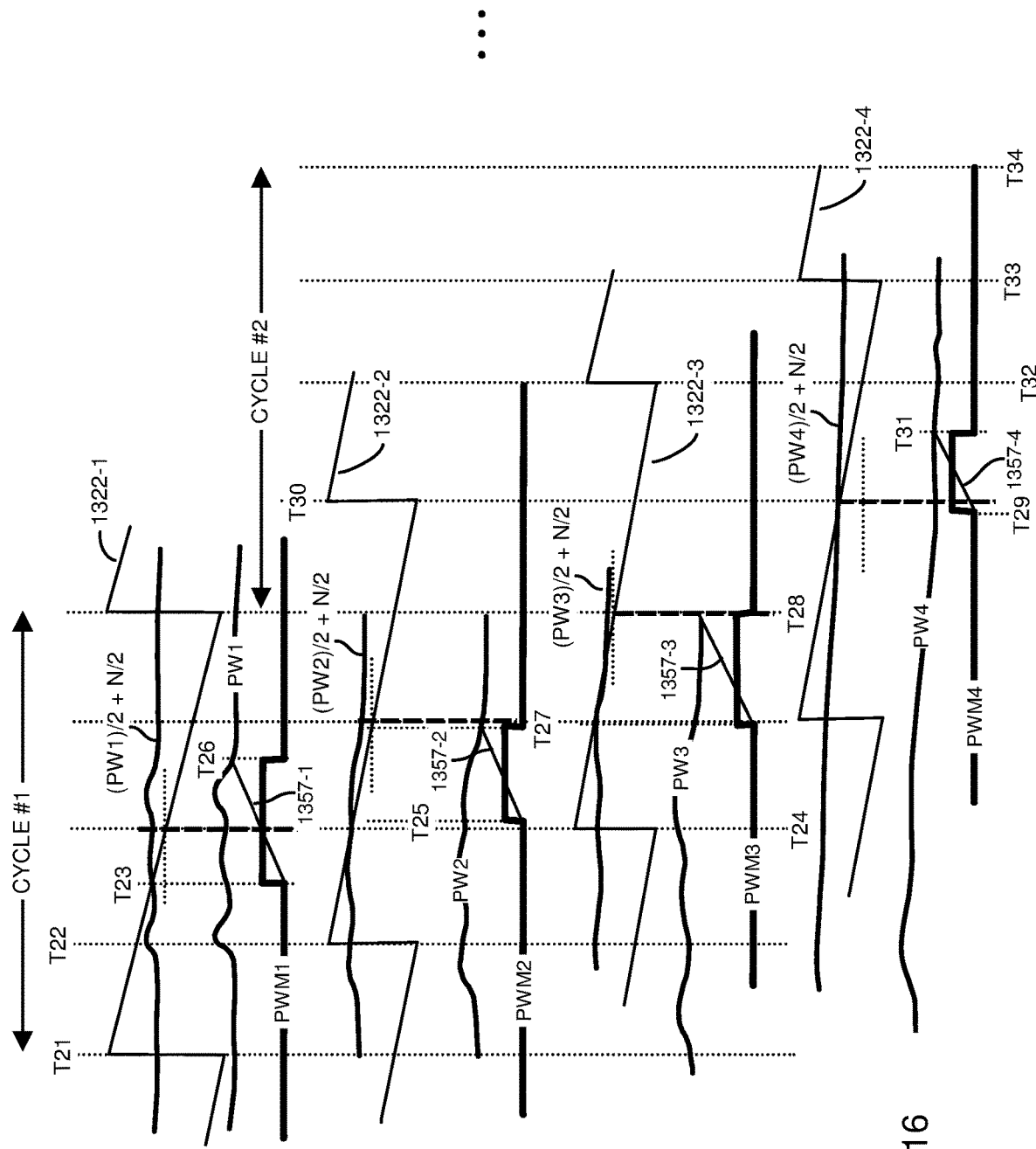
FIG. 16 is an example timing diagram illustrating generation of multiple dual edge pulse width modulation control signals according to embodiments herein.

FIG. 16 is an example timing diagram illustrating generation of multiple dual edge pulse width modulation control signals associated with corresponding power supply phases according to embodiments herein.

In this example embodiment, the controller 140 activates four power supply phases 170-1, 170-2, 170-3, and 170-4. Each of the pulse width modulation signals PWM1, PWM2, PWM3, etc., is offset in time to reduce ripple voltage on the output voltage 123.

For example, the ramp signal 1322-1 generated by the counter 1320-1 associated with the power supply phase 170-1 counts down from time T21 to time T28. In a manner as previously discussed, the respective pulse width modulation generator function 145-1 associated with power supply phase 170-1 generates the leading edge of the pulse width modulation signal PWM1 to occur at time T23; the pulse width modulation generator function 145-1 generates the trailing edge of the pulse width modulation signal PWM1 to occur at time T26.

The ramp signal 1322-2 generated by the counter 1320-2 associated with the power supply phase 170-2 counts down from time T22 to time T30. In a manner as previously discussed, the respective pulse width modulation generator function 145-2 associated with power supply phase 170-2 generates the leading edge of the pulse width modulation signal PWM2 to occur at time T25; the pulse width modulation generator function 145-2 generates the trailing edge of the pulse width modulation signal PWM2 to occur at time T27.

The ramp signal 1322-3 generated by the counter 1320-3 associated with the power supply phase 170-3 counts down from time T24 to time T32. In a manner as previously discussed, the respective pulse width modulation generator function 145-3 associated with power supply phase 170-3 generates the leading edge of the pulse width modulation signal PWM3 to occur at time T27; the pulse width modulation generator function 145-3 generates the trailing edge of the pulse width modulation signal PWM3 to occur at time T28.

The ramp signal 1322-4 generated by the counter 1320-4 associated with the power supply phase 170-4 counts down from time T27 to time T33. In a manner as previously discussed, the respective pulse width modulation generator function 145-4 associated with power supply phase 170-4 generates the leading edge of the pulse width modulation signal PWM4 to occur at time T29; the pulse width modulation generator function 145-4 generates the trailing edge of the pulse width modulation signal PWM4 to occur at time T31.

In this manner, the controller 140 individually controls pulse width modulation signals PWM1, PWM2, PWM3, etc., based on variations in pulse width settings PW1, PW2, PW3, etc. Additionally, the controller 140 varies the switching period of each of the pulse width modulation signals PWM1, PWM2, etc., in a manner as previously discussed.

Figure 17:
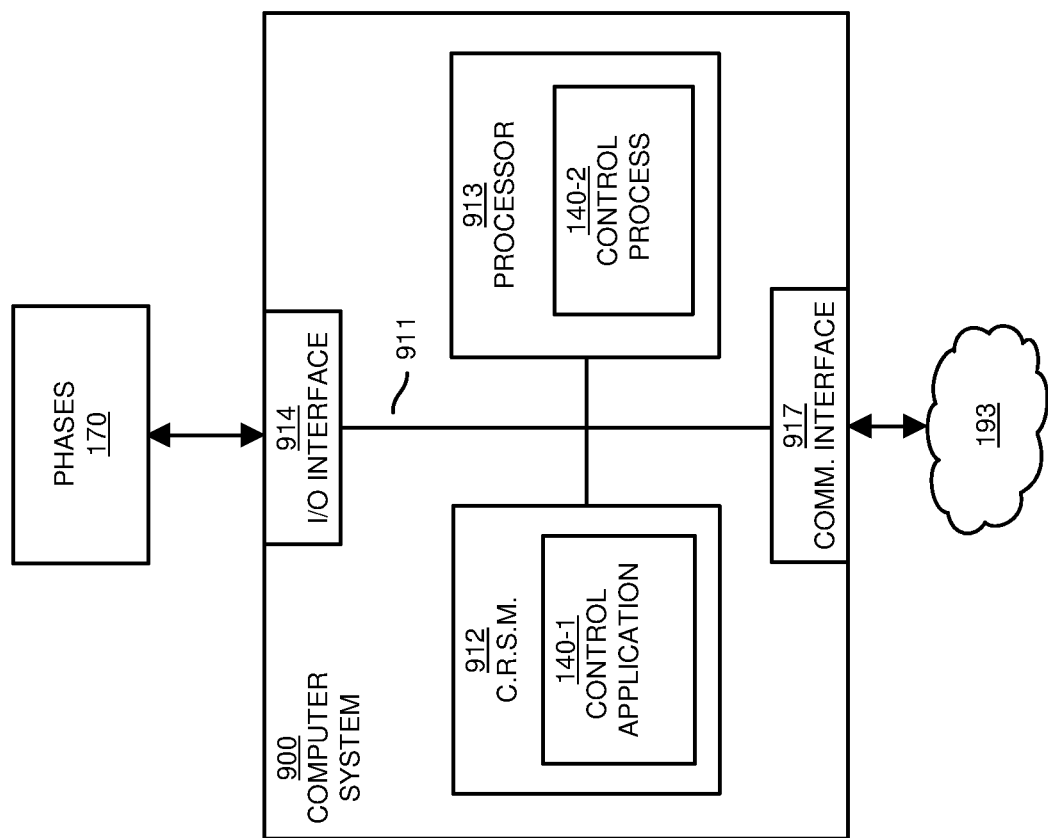
FIG. 17 is an example diagram illustrating computer processor hardware and related software instructions that execute methods according to embodiments herein.

FIG. 17 is an example diagram illustrating computer processor hardware and related software instructions that execute methods according to embodiments herein.

As shown, computer system 900 (such as implemented by any of one or more resources as described herein such as error voltage generator 141, control function 142, PWM generator 143, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914, and a communications interface 917.

I/O interface 914 provides connectivity to any suitable circuitry or component such as phases 170.

Computer readable storage medium 912 can be any hardware storage resource or device such as memory, optical storage, hard drive, floppy disk, etc. In one embodiment, the computer readable storage medium 912 stores instructions and/or data used by the controller application 140-1 to perform any of the operations as described herein.

Further in this example embodiment, communications interface 917 enables the computer system 900 and processor 913 to communicate over a resource such as network 190 to retrieve information from remote sources and communicate with other computers.

As shown, computer readable storage media 912 is encoded with controller application 140-1 (e.g., software, firmware, etc.) executed by processor 913. Controller application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in controller application 140-1 stored on computer readable storage medium 912.

Execution of the controller application 140-1 produces processing functionality such as controller process 140-2 in processor 913. In other words, the controller process 140-2 associated with processor 913 represents one or more aspects of executing controller application 140-1 within or upon the processor 913 in the computer system 900.

In accordance with different embodiments, note that computer system 900 can be a micro-controller device, logic, hardware processor, hybrid analog/digital circuitry, etc., configured to control a power supply and perform any of the operations as described herein.

Functionality supported by the different resources will now be discussed via flowcharts 1800 in FIG. 18 and flowchart 1900 in FIG. 19. Note that the steps in the flowcharts below can be executed in any suitable order.

Figure 18:
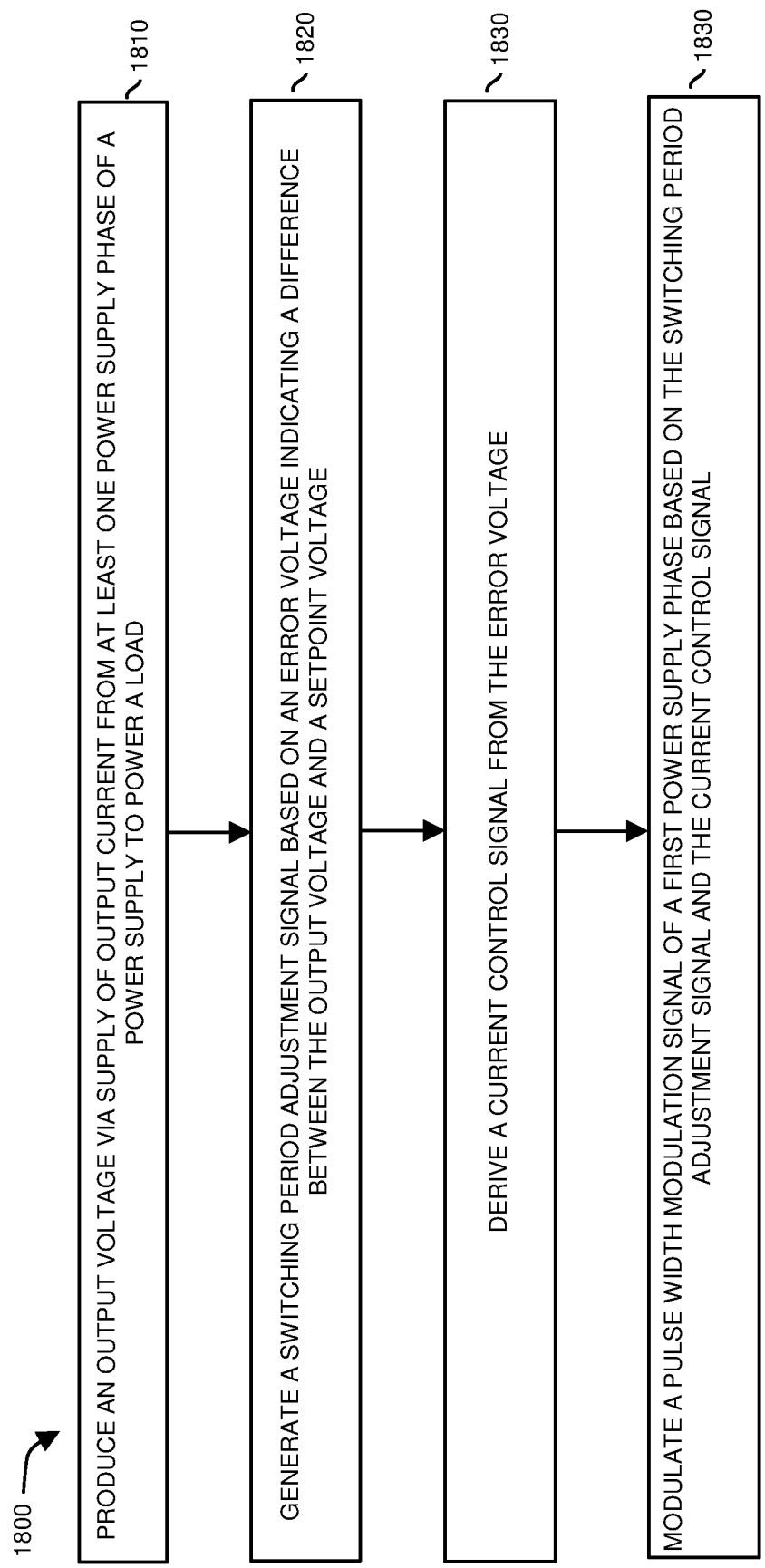
FIG. 18 is an example diagram illustrating a method according to embodiments herein.

FIG. 18 is an example diagram illustrating a method of controlling a power converter according to embodiments herein.

In processing operation 1810, the controller 140 produces an output voltage 123 via supply of output current 149 from at least one power supply phase (phase circuitry 170) of a power supply to power a load 118.

In processing operation 1820, the controller 140 generates a switching period adjustment signal 135-1 based on an error voltage signal 132 indicating a difference between the output voltage 123 and a setpoint voltage 131.

In processing operation 1830, the controller 140 derives a current control signal 137 from the error voltage signal 132.

In processing operation 1840, the controller 140 generates (such as modulates) a pulse width modulation signal of a first power supply phase based on the switching period adjustment signal 135-1 and the current control signal 137.

Figure 19:
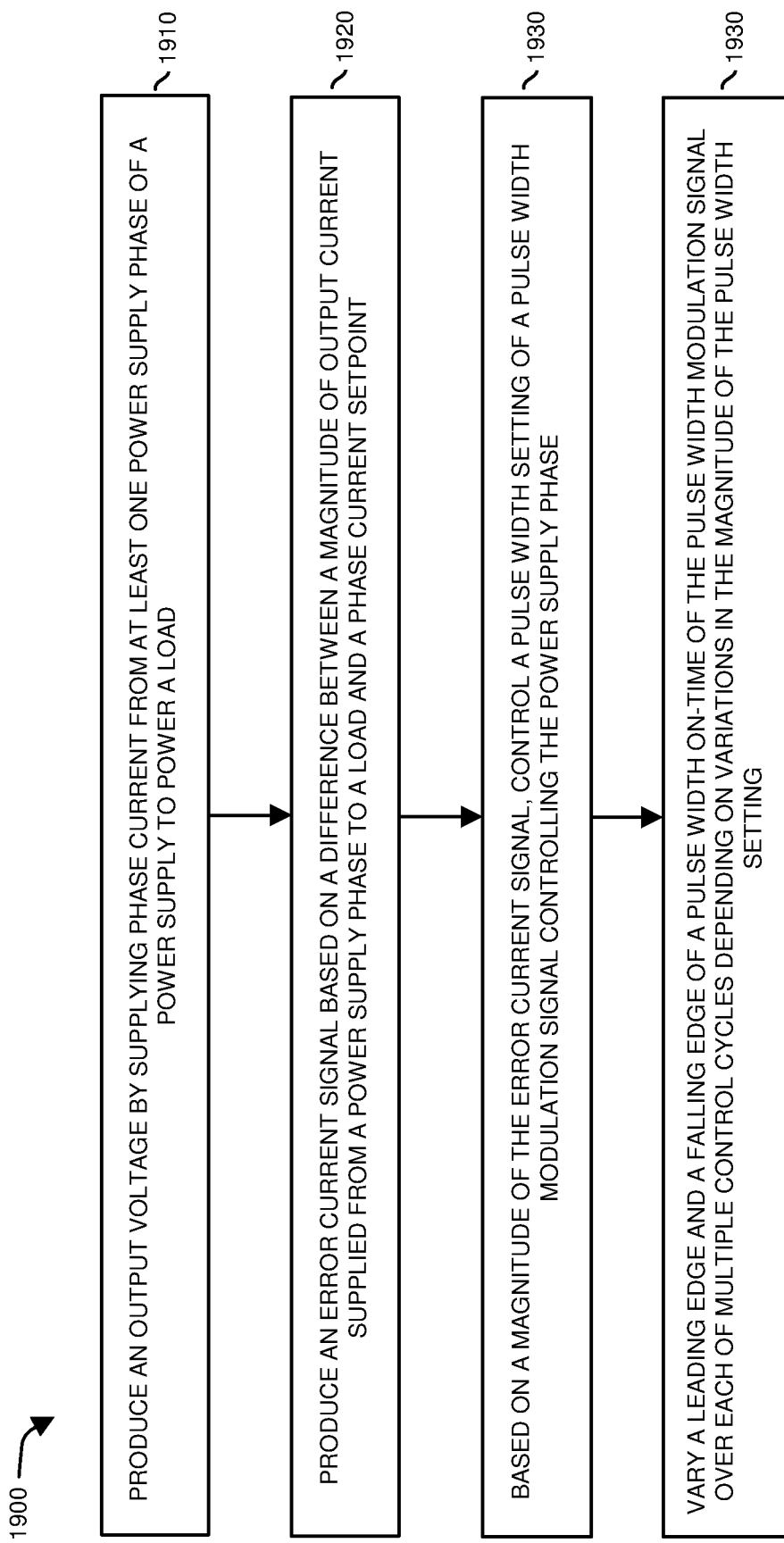
FIG. 19 is an example diagram illustrating a method according to embodiments herein.

FIG. 19 is an example diagram illustrating a method of controlling a power converter according to embodiments herein.

In processing operation 1910, the controller 140 produces an output voltage 123 by supplying phase current from at least one power supply phase 170-1 to power load 118.

In processing operation 1920, the controller 140 produces an error current signal 521 based on a difference between a magnitude of output current 525-1 supplied from a power supply phase 170-1 to the load 118 and a phase current setpoint (as indicated by signal 561).

In processing operation 1930, based on a magnitude of the error current signal 521, the controller 140 controls a pulse width setting PW1 of the pulse width modulation signal PWM1 controlling the power supply phase 170-1.

In processing operation 1940, the controller 140 varies a leading edge and a falling edge of a pulse width on-time (PW1) of the pulse width modulation signal PWM1 over each of multiple control cycles depending on variations in the magnitude of the pulse width setting PW1 over time.

Figure 20:
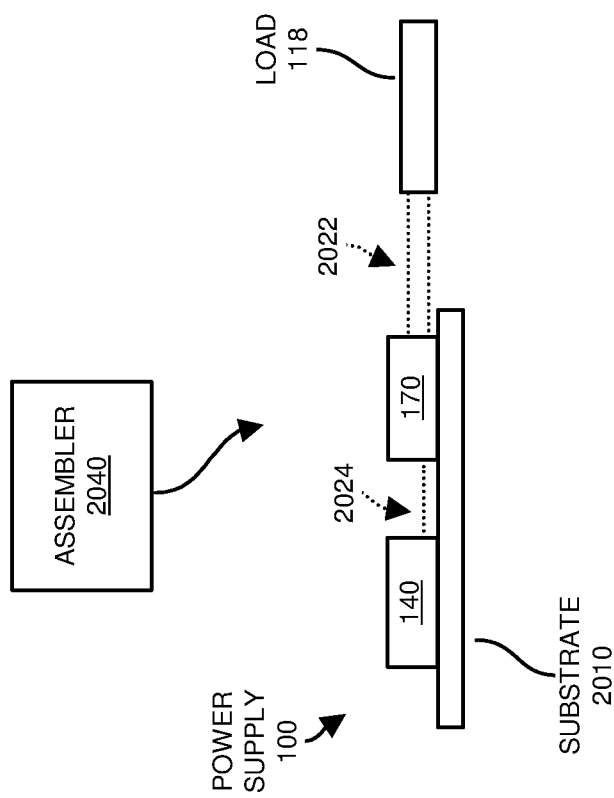
FIG. 20 is an example diagram illustrating assembly of a circuit according to embodiments herein.

FIG. 20 is an example diagram illustrating assembly of a control system (such as a circuit) according to embodiments herein.

In this example embodiment, assembler 2040 receives a substrate 2010 and corresponding components of power supply 100 such as one or more of controller 140, and corresponding phase circuitry 170 such as including one or more power supply phases 170-1, 170-2, 170-3, etc. Each of the controller 140 and power supply phases can be configured to include the components as previously discussed. The assembler 2040 affixes (couples) the controller 140 and power supply phase circuitry 170 to the substrate 2010.

Via one or more respective circuit paths (such as traces, cables, wiring, etc.) as described herein, the fabricator 2040 provides connectivity 2024 between one or more components associated with the power supply 100 such as between the controller 140 and the power supply phase circuitry 170. Note further that components such as the controller 140 and corresponding power supply phase components can be affixed or coupled to the substrate 2010 in any suitable manner. For example, one or more of the components in power supply 100 and/or controller 140 can be soldered to the substrate 2010, inserted into sockets disposed on the substrate 2010, etc.

Additionally, in one embodiment, the substrate 2010 is optional. Any of one or more circuit paths or connectivity as shown in the above drawings and as described herein can be disposed in cables, flexible substrates, or other suitable media.

In one nonlimiting example embodiment, the power supply 100 and/or components is/are disposed on its own assembly independent of substrate 2010; the substrate of the load 118 is directly or indirectly connected to the substrate 2010 via a link 2022 such as wires, cables, links, etc. The controller 140 or any portion of the power supply 100 can be disposed on a standalone smaller board plugged into a socket of the substrate 2010 as well.

As previously discussed, via one or more circuit paths 2022 (such as one or more traces, cables, connectors, wires, conductors, electrically conductive paths, etc.), the assembler 2040 couples the power supply 100 and corresponding components to the load 118. In one embodiment, the circuit path 2022 conveys current from an output voltage 123 to the load 118.

Accordingly, embodiments herein include a system comprising: a substrate 2010 (such as a circuit board, standalone board, mother board, standalone board destined to be coupled to a mother board, host, etc.); a power supply 100 including corresponding one or more components as described herein.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 2010 or disposed at a remote location.

Note again that techniques herein are well suited for use in providing more efficient generation of an output voltage to drive a respective load. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a current mode controller operative to:
   produce an output voltage by supplying output current from a first power supply phase of a power supply to power a load;
   produce an error current signal based on a difference between a magnitude of the output current supplied from the first power supply phase to the load and an output current setpoint;
   based on a magnitude of the error current signal, generate a pulse width setting associated with a pulse width modulation signal for controlling the first power supply phase;
   vary a leading edge and a trailing edge of a pulse width ON-time of the pulse width modulation signal over each of multiple control cycles depending on variations in a magnitude of the pulse width setting; and
   wherein the magnitude of the pulse width setting of the pulse width modulation signal varies during the pulse width ON-time of the pulse width modulation signal.

2. The apparatus as in claim 1, wherein the current mode controller is further operative to:
   produce an error voltage signal based on a difference between a magnitude of the output voltage supplied from the first power supply phase to the load and a voltage setpoint; and
   derive, from the error voltage signal, the output current setpoint in which to control the output current supplied by the first power supply phase to the load.

3. The apparatus as in claim 2, wherein the current mode controller is further operative to vary a switching frequency of the pulse width modulation signal based on a magnitude of the error voltage signal, the error voltage signal representing a difference between a magnitude of the output voltage and a magnitude of the voltage setpoint.

4. The apparatus as in claim 1, wherein the current mode controller is further operative to:
   determine a magnitude of the output voltage based on a voltage feedback signal representative of the output voltage applied to the load;
   emulate the output current over time based on a current feedback signal representative of the magnitude of the output current supplied by the first power supply phase to the load and a state of the pulse width modulation signal controlling switching of the first power supply phase; and
   determine the magnitude of the output current over time from the first power supply phase to the load based on the emulated output current.

5. The apparatus as in claim 1, wherein the current mode controller is further operative to: i) receive a current measurement signal approximating the magnitude of the output current supplied by the first power supply phase to the load, ii) derive an emulated output current signal from the current measurement signal, and iii) determine the magnitude of the output current from the first power supply phase to the load based on the emulated output current signal.

6. The apparatus as in claim 1, wherein the current mode controller is further operative to:
   for a first control cycle of the multiple control cycles:
   generate a first ramp signal;
   derive a pulse width signal from the pulse width setting, the pulse width signal representing an amount of time in which to activate high side switch circuitry in the first power supply phase to convert an input voltage into the output voltage; and
   control timing of the leading edge of the pulse width modulation signal based on a magnitude of the pulse width signal with respect to the first ramp signal.

7. The apparatus as in claim 6, wherein the current mode controller is further operative to:
   for the first control cycle:
   generate a second ramp signal with respect to the leading edge; and
   control timing of the trailing edge of the pulse width modulation signal based on the magnitude of the pulse width setting with respect to the second ramp signal.

8. The apparatus as in claim 7, wherein the magnitude of the pulse width signal at the leading edge of the first control cycle is different than the magnitude of the pulse width signal at the trailing edge of the first control cycle.

9. The apparatus as in claim 1, wherein a timing of the leading edge of the pulse width modulation signal in a first control cycle of multiple control cycles depends on the magnitude of the pulse width setting; and
   wherein a timing of the trailing edge of the pulse width modulation signal in the first control cycle of the multiple control cycles depends on the magnitude of the pulse width setting.

10. The apparatus as in claim 1, wherein the magnitude of the pulse width setting at the leading edge of the pulse width modulation signal for a first control cycle is a first pulse width value; and
    wherein the magnitude of the pulse width setting at the trailing edge of the pulse width modulation signal for the first control cycle is a second pulse width value, the second pulse width value different than the first pulse width value.

11. The apparatus as in claim 1, wherein the output current is a first output current;
    wherein the power supply includes a second power supply phase operative to supply second output current to the load;
    the apparatus further comprising: a current monitor operative to: based on a magnitude of the first output current and a magnitude of the second output current, balance the first output current and the second output current via adjustment of a switching frequency of controlling operation of the first power supply phase and the second power supply phase.

12. A system comprising:
a circuit substrate;
the apparatus of claim 1 coupled to the circuit substrate; and
wherein the current mode controller controls the first power supply phase.

13. A method comprising:
receiving a circuit substrate; and
coupling the apparatus of claim 1 to the circuit substrate.

14. The apparatus as in claim 1, wherein the current mode controller is further operative to:
control timing of the trailing edge of the pulse width modulation signal based on comparison of the pulse width setting to a first ramp signal.

15. The apparatus as in claim 14, wherein the current controller is operative to:
control timing of the leading edge of the ON-time of the pulse width modulation signal based on an offset pulse width setting crossing a second ramp signal.

16. The apparatus as in claim 1, wherein the controller is operative to control a timing of the trailing edge of the pulse width modulation signal in a respective control cycle depending on occurrence of a transient overvoltage condition associated with the output voltage.

17. The apparatus as in claim 1, wherein a magnitude of the pulse width setting at the leading edge of the pulse width modulation signal is a first value; and
wherein the magnitude of the pulse width setting at the trailing edge of the pulse width modulation signal for the first control cycle is a second value different than the first value in response to a transient current consumption condition by the load during the ON-time duration.

18. The apparatus as in claim 1, wherein the controller is operative to control timing of the trailing edge of the ON-time to be nearer to a beginning of a respective control cycle in response to detection of the output voltage being above a setpoint reference voltage.

19. A method comprising:
producing an output voltage by supplying phase current from at least one power supply phase of a power supply to power a load;
producing an error current signal based on a difference between a magnitude of first output current supplied from a first power supply phase to the load and a phase current setpoint;
based on a magnitude of the error current signal, controlling a pulse width setting of a pulse width modulation signal controlling the first power supply phase; and
varying a leading edge and a trailing edge of a pulse width ON-time of the pulse width modulation signal over each of multiple control cycles depending on variations in the magnitude of the pulse width setting;
the method further comprising: for a first control cycle of the multiple control cycles:
generating a first ramp signal;
deriving a pulse width signal from the pulse width setting, the pulse width signal representing an amount of time in which to activate high side switch circuitry in the power supply to convert an input voltage into the output voltage; and
controlling timing of the leading edge of the pulse width modulation control signal based on a magnitude of the pulse width signal with respect to the first ramp signal.

20. The method as in claim 19 further comprising:
producing an error voltage signal based on a difference between a magnitude of output voltage supplied from a power supply to the load and a voltage setpoint; and
deriving, from an error voltage as indicated by the error voltage signal, the phase current setpoint in which to control the first output current supplied by the first power supply phase to the load.

21. The method as in claim 20 further comprising:
varying a switching frequency of the pulse width modulation signal based on a magnitude of the error voltage, the error voltage representing a difference between a magnitude of the output voltage and the voltage setpoint of producing the output voltage.

22. The method as in claim 19 further comprising:
determining the magnitude of the first output current over time from an emulated current signal representing the first output current supplied from the power supply to the load;
determining a magnitude of the output voltage based on a voltage feedback signal representative of the output voltage applied to the load;
emulating the phase current over time based on a current feedback signal representative of the phase current supplied by the first power supply phase and a state of the pulse width modulation signal controlling switching operation of the first power supply phase; and
determining the magnitude of the first output current from the first power supply phase based on the emulated phase current.

23. The method as in claim 19 further comprising:
receiving a current measurement signal approximating a magnitude of the first output current supplied by the first power supply phase to the load;
deriving an emulated current signal from the current measurement signal; and
determining the magnitude of the first output current from the first power supply phase based on the emulated phase current.

24. The method as in claim 19 further comprising:
for the first control cycle:
generating a second ramp signal with respect to the leading edge; and
controlling timing of the trailing edge of the pulse width modulation control signal based on the magnitude of the pulse width setting with respect to the second ramp signal.

25. The method as in claim 24, wherein the magnitude of the pulse width signal at the leading edge of the first control cycle is different than the magnitude of the pulse width signal at the trailing edge of the first control cycle.

26. The method as in claim 19, wherein a timing of the leading edge of the pulse width modulation signal in a first control cycle of the multiple control cycles depends on the magnitude of the pulse width setting; and
wherein a timing of the trailing edge of the pulse width modulation signal in the first control cycle of the multiple control cycles depends on the magnitude of the pulse width setting.

27. The method as in claim 19, wherein the magnitude of the pulse width setting at the leading edge of the pulse width modulation signal for a first control cycle is a first pulse width value; and
wherein the magnitude of the pulse width setting at the trailing edge of the pulse width modulation signal for the first control cycle is a second pulse width value, the second pulse width value different than the first pulse width value.

28. The method as in claim 19, wherein the magnitude of the pulse width setting of the pulse width modulation signal varies during the pulse width ON-time of the pulse width modulation signal.

29. The method as in claim 19 further comprising:
supplying the first output current from the first power supply phase to the load;
supplying a second output current from a second power supply phase to the load; and
based on a magnitude of the first output current and a magnitude of the second output current, balancing the first output current and the second output current via adjustment of a switching frequency of controlling operation of the first power supply phase and the second power supply phase.

30. An apparatus comprising:
a current mode controller operative to:
    produce an output voltage by supplying output current from a first power supply phase of a power supply to power a load;
    produce an error current signal based on a difference between a magnitude of the output current supplied from the first power supply phase to the load and an output current setpoint;
    based on a magnitude of the error current signal, generate a pulse width setting associated with a pulse width modulation signal for controlling the first power supply phase;
    vary a leading edge and a trailing edge of a pulse width ON-time of the pulse width modulation signal over each of multiple control cycles depending on variations in a magnitude of the pulse width setting; and
wherein the current mode controller is further operative to:
    offset the pulse width setting to produce an offset pulse width setting; and
    control timing of the leading edge of the pulse width modulation signal based on a magnitude of the offset pulse width setting with respect to a ramp signal.

31. The apparatus as in claim 30, wherein the current controller is operative to:
select the leading edge of the ON-time of the pulse width modulation signal based on the offset pulse width setting crossing the ramp signal.

32. An apparatus comprising:
a current mode controller operative to:
    produce an output voltage by supplying output current from a first power supply phase of a power supply to power a load;
    produce an error current signal based on a difference between a magnitude of the output current supplied from the first power supply phase to the load and an output current setpoint;
    based on a magnitude of the error current signal, generate a pulse width setting associated with a pulse width modulation signal for controlling the first power supply phase;
    vary a leading edge and a trailing edge of a pulse width ON-time of the pulse width modulation signal over each of multiple control cycles depending on variations in a magnitude of the pulse width setting; and
wherein the controller is operative to control a timing of the leading edge of the pulse width modulation signal within a respective control cycle depending on occurrence of a transient undervoltage condition associated with the output voltage.

33. An apparatus comprising:
a current mode controller operative to:
    produce an output voltage by supplying output current from a first power supply phase of a power supply to power a load;
    produce an error current signal based on a difference between a magnitude of the output current supplied from the first power supply phase to the load and an output current setpoint;
    based on a magnitude of the error current signal, generate a pulse width setting associated with a pulse width modulation signal for controlling the first power supply phase;
    vary a leading edge and a trailing edge of a pulse width ON-time of the pulse width modulation signal over each of multiple control cycles depending on variations in a magnitude of the pulse width setting;
    wherein the controller is operative to
        control a first time duration between a beginning of a first control cycle and the leading edge of the pulse width ON-time in the first control cycle, the first time duration being greater than zero; and
        control a timing of the trailing edge of the pulse width ON-time to occur prior to an end of the first control cycle.

34. An apparatus comprising:
a current mode controller operative to:
    produce an output voltage by supplying output current from a first power supply phase of a power supply to power a load;
    produce an error current signal based on a difference between a magnitude of the output current supplied from the first power supply phase to the load and an output current setpoint;
    based on a magnitude of the error current signal, generate a pulse width setting associated with a pulse width modulation signal for controlling the first power supply phase;
    vary a leading edge and a trailing edge of a pulse width ON-time of the pulse width modulation signal over each of multiple control cycles depending on variations in a magnitude of the pulse width setting; and
wherein the current mode controller is operative to control timing of the leading edge of the ON-time to be nearer to a beginning of a respective control cycle in response to detection of the output voltage being below a setpoint reference voltage at a beginning of the respective control cycle.

* * * * *